United States Patent
Sasaki

(10) Patent No.: US 7,400,565 B2
(45) Date of Patent: Jul. 15, 2008

(54) REPRODUCTION METHOD, A PROGRAM, A RECORDING MEDIUM, AND A DRIVE APPARATUS

(75) Inventor: Yoshiyuki Sasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 767 days.

(21) Appl. No.: 10/830,151

(22) Filed: Apr. 23, 2004

(65) Prior Publication Data

US 2004/0213117 A1 Oct. 28, 2004

(30) Foreign Application Priority Data

Apr. 24, 2003 (JP) .............................. 2003-119781

(51) Int. Cl.
*G11B 7/004* (2006.01)
(52) U.S. Cl. ............... 369/53.24; 369/53.35; 369/30.04
(58) Field of Classification Search .............. 369/30.02, 369/53.24, 53.35
See application file for complete search history.

(56) References Cited

U.S. PATENT DOCUMENTS

| | | | | |
|---|---|---|---|---|
| 5,475,820 | A * | 12/1995 | Natrasevschi et al. | 711/100 |
| 6,229,777 | B1 * | 5/2001 | Ishitobi et al. | 369/53.25 |
| 6,549,489 | B1 * | 4/2003 | Van Der Enden et al. | 369/30.11 |
| 6,560,170 | B2 * | 5/2003 | Hirose | 369/30.04 |
| 6,587,415 | B1 * | 7/2003 | Imai et al. | 369/53.22 |
| 6,680,890 | B2 * | 1/2004 | Suzuki et al. | 369/53.24 |
| 7,050,701 | B1 * | 5/2006 | Sasaki et al. | 386/95 |
| 2002/0024902 | A1 | 2/2002 | Sasaki | |
| 2002/0051409 | A1 * | 5/2002 | Sako et al. | 369/30.11 |
| 2002/0114245 | A1 | 8/2002 | Sasaki | |
| 2002/0159353 | A1 | 10/2002 | Sasaki | |
| 2003/0033475 | A1 | 2/2003 | Sasaki | |
| 2003/0133369 | A1 | 7/2003 | Sasaki | |
| 2003/0163638 | A1 | 8/2003 | Sasaki | |
| 2003/0223338 | A1 | 12/2003 | Sasaki | |
| 2004/0057366 | A1 | 3/2004 | Sasaki | |

FOREIGN PATENT DOCUMENTS

| | | |
|---|---|---|
| JP | 7-326158 | 12/1995 |
| JP | 11-120573 | 4/1999 |
| JP | 2000-293941 | 10/2000 |

* cited by examiner

*Primary Examiner*—Dwayne Bost
*Assistant Examiner*—Kezhen Shen
(74) *Attorney, Agent, or Firm*—Dickstein Shapiro LLP

(57) ABSTRACT

A method for reproducing contents of an information recording medium, having at least one data zone, is disclosed, wherein a determination is made as to whether the entirety of a requested reproduction zone included in the data zone of the information recording medium contains data, or at least a part thereof belongs to a non-recorded zone at a predetermined timing on or after a point in time when the reproduction request is made. Then, when a reproduction request is made for a reproduction zone including such non-recorded zone, it is subsequently determined at the predetermined timing that the non-recorded zone is present in the reproduction zone, and an error process starts.

38 Claims, 14 Drawing Sheets

| POSITION | CONTENTS | NUMBER OF BYTES |
|---|---|---|
| $B_0 \sim B_2$ | 「FRG」(465247H) | 3 |
| $B_3 \sim B_4$ | FRAGMENT NUMBER | 2 |
| $B_5 \sim B_7$ | FRAGMENT START ADDRESS | 3 |
| $B_8 \sim B_{10}$ | FRAGMENT END ADDRESS | 3 |
| $B_{11} \sim B_{15}$ | RESERVED | 5 |

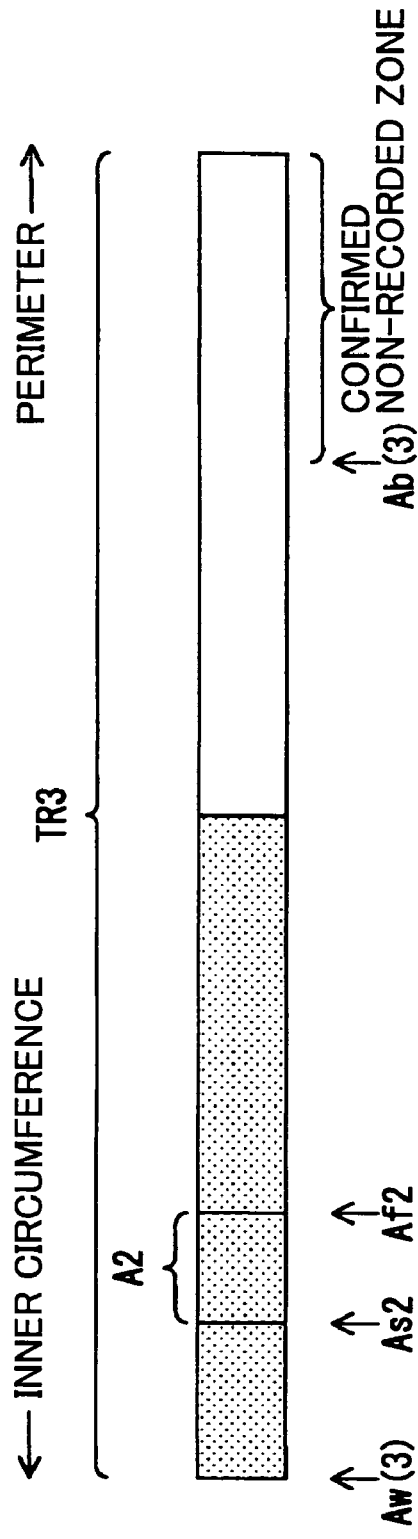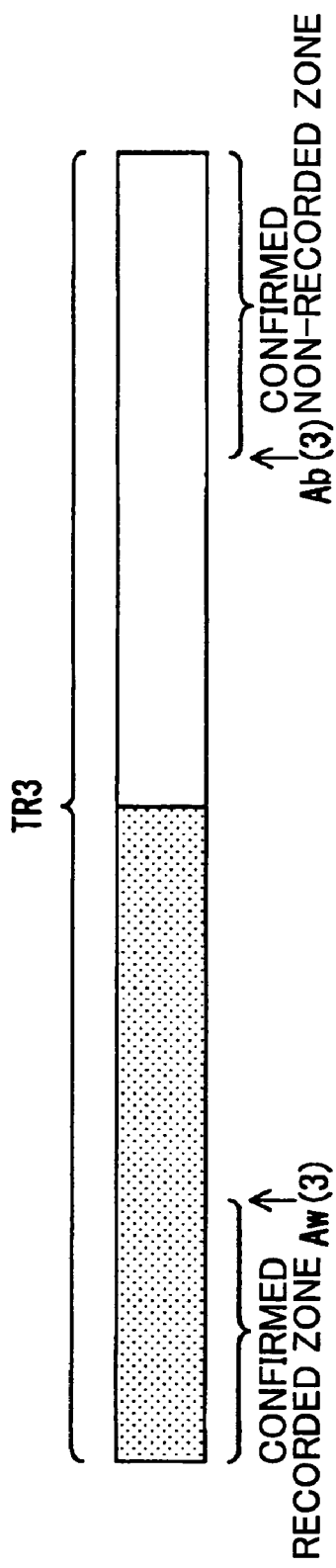

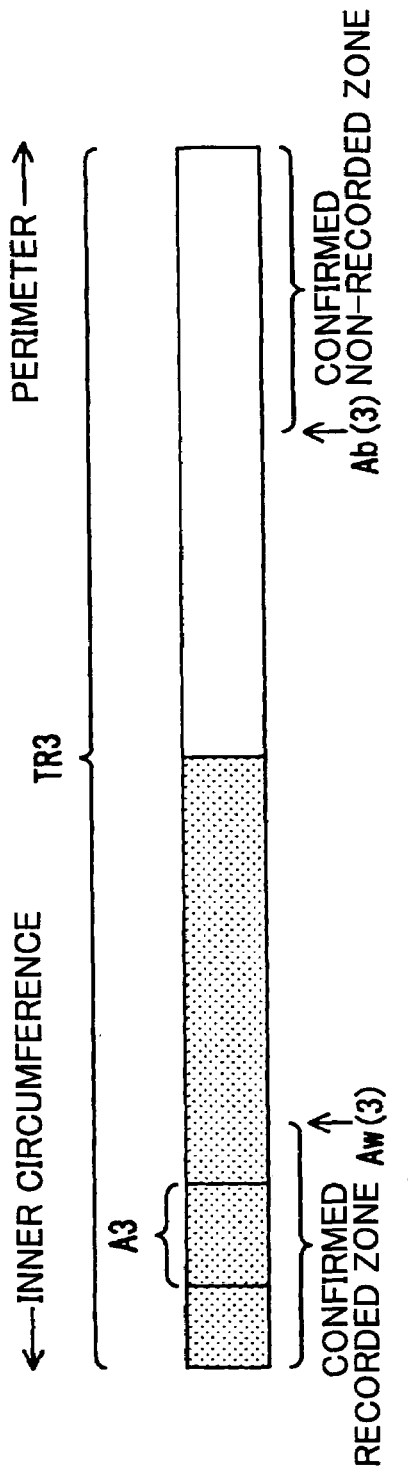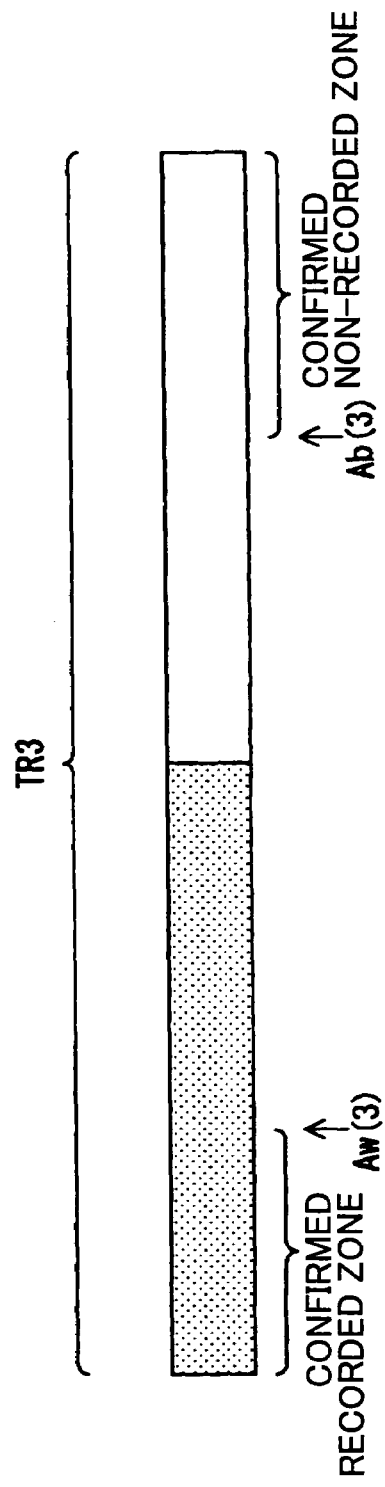

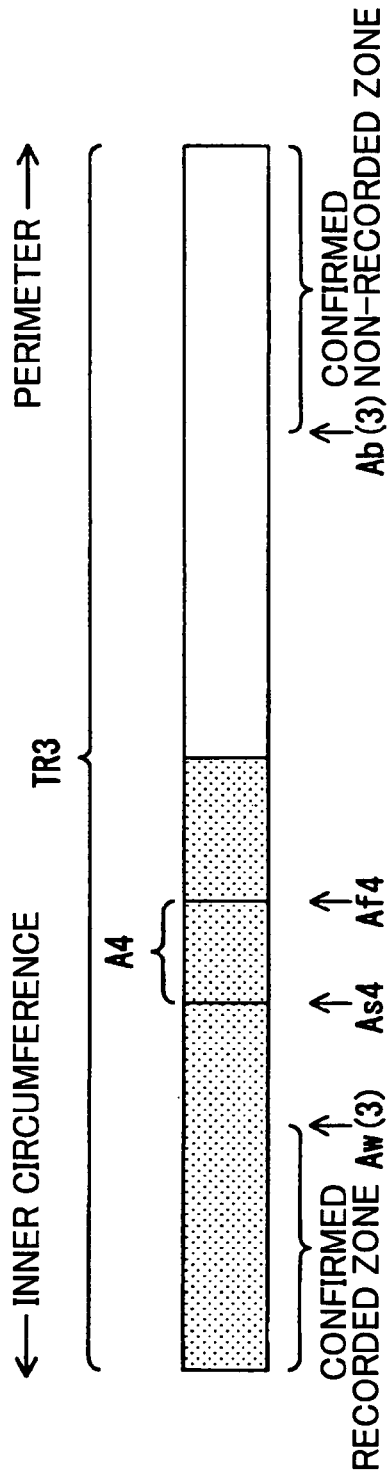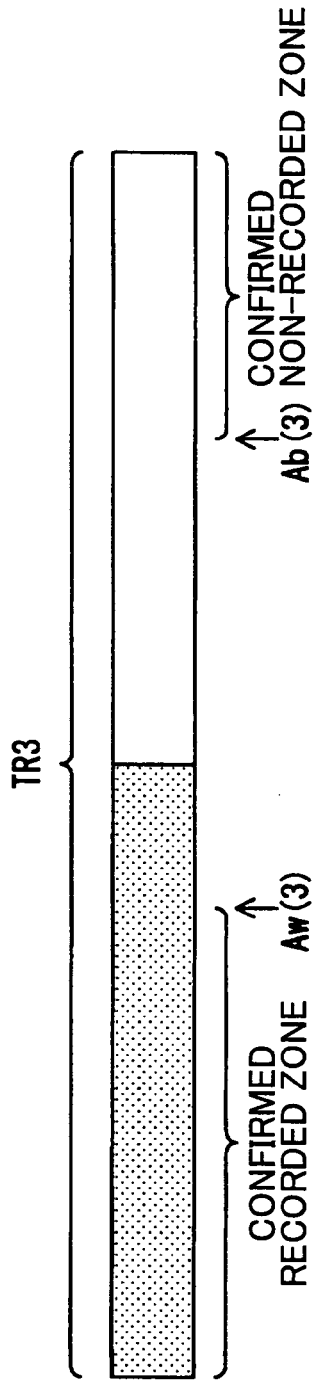

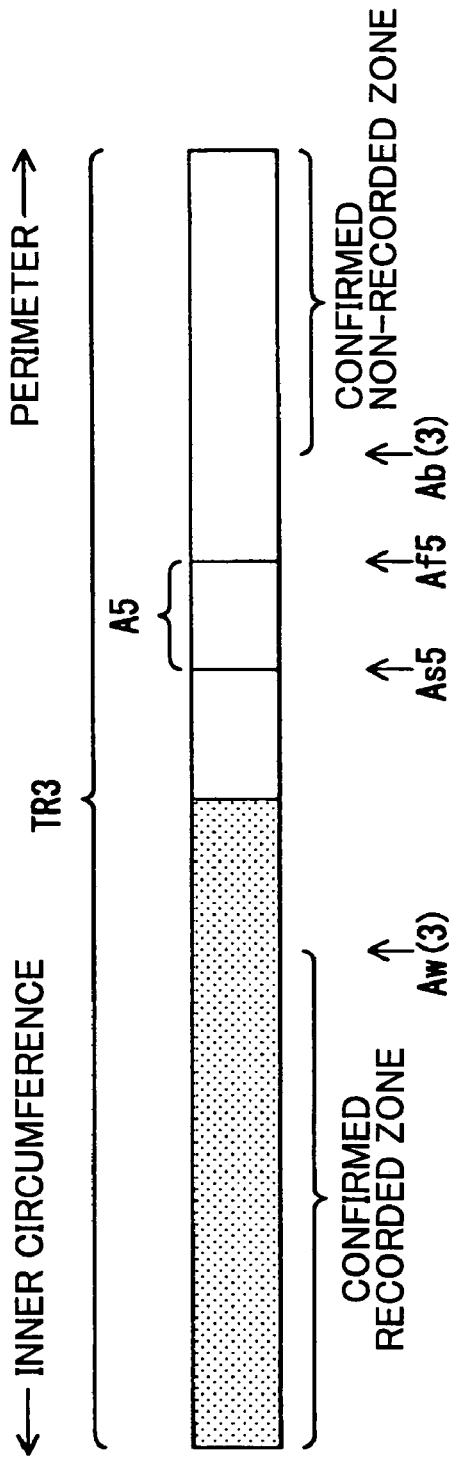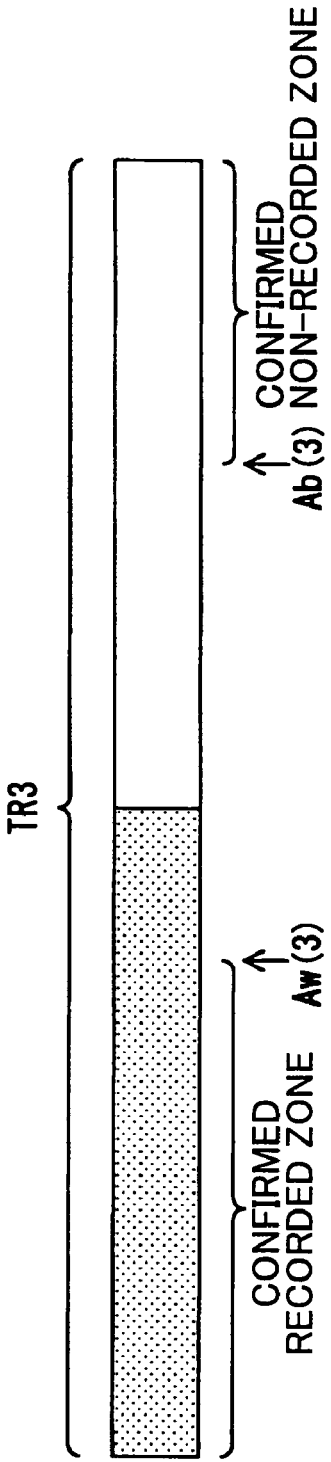

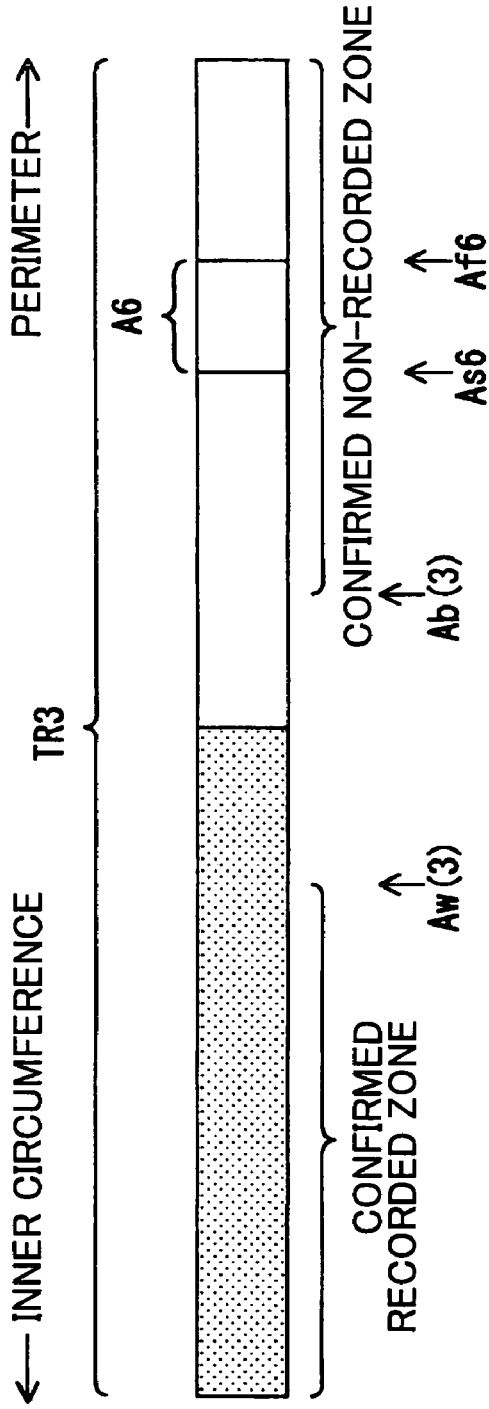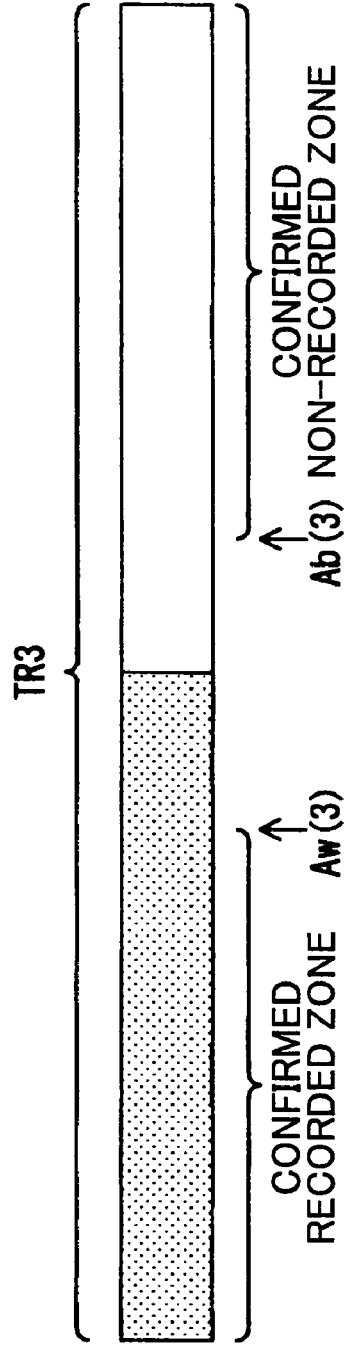

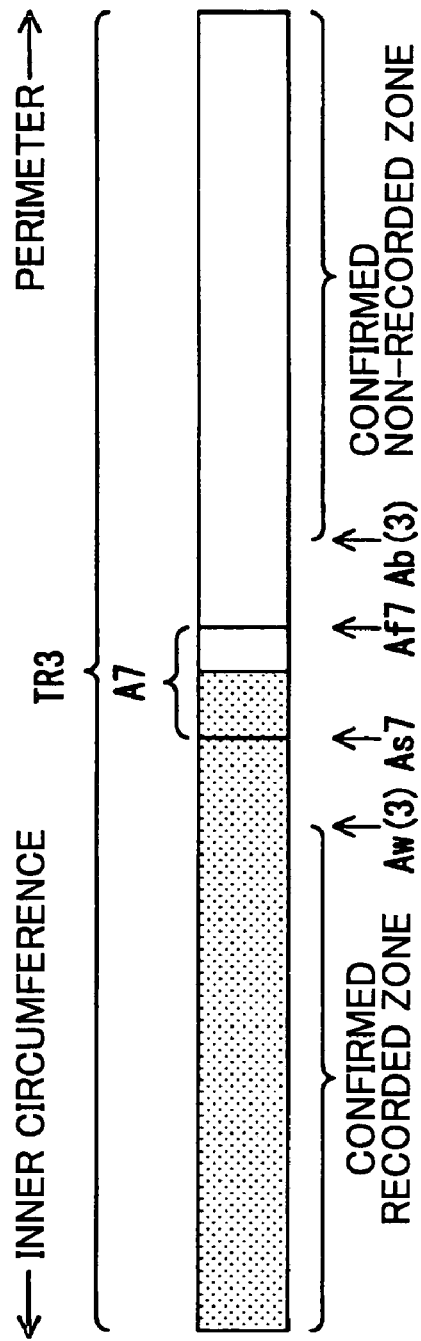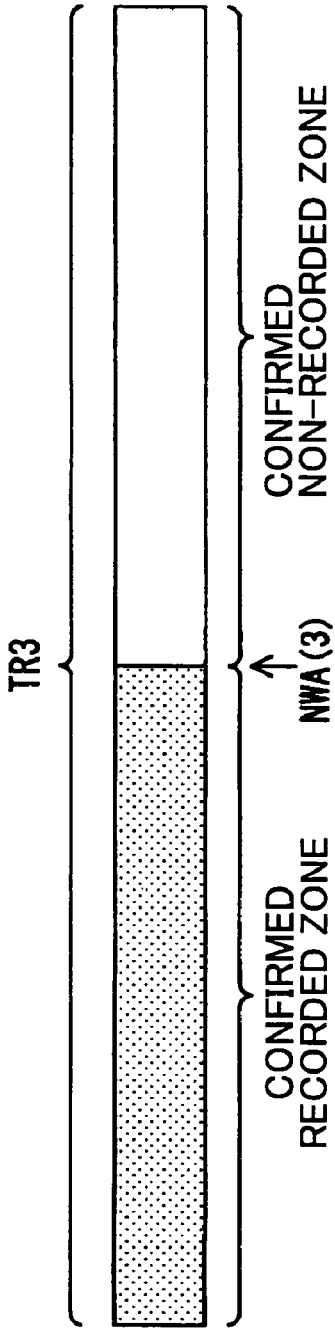

FIG.15

| POSITION | CONTENTS | NUMBER OF BYTES |
|---|---|---|
| B0 ~ B2 | 「PRS」(505253H) | 3 |
| B3 | RESERVED | 1 |
| B4 | PREVIOUS SESSION NUMBER | 1 |
| B5 ~ B7 | PREVIOUS SESSION START ADDRESS | 3 |
| B8 ~ B10 | PREVIOUS SESSION END ADDRESS | 3 |
| B11 ~ B15 | RESERVED | 5 |

REPRODUCTION METHOD, A PROGRAM, A RECORDING MEDIUM, AND A DRIVE APPARATUS

BACKGROUND OF THE INVENTION

1. Field of the Invention

The present invention generally relates to a reproduction method, a program, a recording medium, and a drive apparatus, and especially relates to a reproduction method for reproducing information recorded on an information recording medium, a computer-executable program and the information recording medium for storing the program, and a drive apparatus for carrying out at least reproduction of contents of the information recording medium, which drive apparatus does not have to be, but may also be capable of recording and erasing contents of the information recording medium.

2. Description of the Related Art

With advancements of personal computers (PCs), it has become possible to deal with AV (Audio-Visual) information, such as music and images. Since the amount of the AV information is very large, optical disks, such as a CD (compact disk), and a DVD (digital versatile disk) capable of recording data of about 7 times as much as the CD on a disk of the same diameter as the CD, come to attract attention as an information recording medium. With the prices of CDs and DVDs having dropped, optical disk apparatuses capable of handling CDs and DVDs have come to spread. Here, as an optical disk of the CD system, CD-ROM, CD-R (CD-recordable), CD-RW (CD-rewritable), etc., are marketed; and as for the DVD system, DVD-ROM, DVD-RAM, DVD-R (DVD-recordable), DVD-RW (DVD-rewritable), DVD+R (DVD+recordable), DVD+RW (DVD+rewritable), etc., are marketed.

As for the recordable disks, such as CD-R, DVD+R, etc., a recording zone, in which data are recorded, is divided into tracks ("fragments" in the case of DVD+R) such that the data are recorded on each track. This method is called multi-track recording. In the following, for convenience, both tracks and fragments are generically called tracks.

For example, in a DVD+R, up to 16 tracks can be set up as a session. In a zone called the lead-in zone (LIZ), a block called the session disk control block (SDCB) is provided that stores information about the tracks included in a session, such as track numbers, starting addresses of the tracks, ending addresses of the tracks, etc., the information being called track information. Usually, the track information recorded on the SDCB is read when the DVD+R is loaded (mounted) to a predetermined position of an optical disk apparatus, and the track information is held in a memory such that the track information can be referred to when required. In the case of DVD+R, up to 191 sessions can be present on the disk. When there are two or more sessions, the track information of the second session and all the subsequent sessions is recorded in SDCBs that are provided in a zone called "intro" of each of the sessions other than the first session.

Further, in DVD+R, multiple pieces of data can be recorded in a track one by one at different times so that files having a comparatively small amount of data can be recorded on the track. Accordingly, a state of the track is generally one of being fully recorded, being totally vacant, and having a recorded zone where data are recorded and a non-recorded zone where there are no data recorded. A track having a recorded zone and a non-recorded zone is called a partially recorded track. Generally, data have to be continuously recorded in a track from the starting address of the track. For this reason, it is necessary to determine the boundary position between the recorded zone and the non-recorded zone of the track, when adding data to a partially recorded track. The address that represents the boundary position is called the next writable address (NWA). Although the starting address and the ending address of a track are recorded in the SDCB as described above, the information about the boundary position between a recorded zone and a non-recorded zone, for example, NWA, is not recorded anywhere. Therefore, when adding data to a partially recorded track, NWA has to be detected each time recording is to be carried out.

In the case of CD-R, although the greatest number of sessions is not prescribed, the greatest number of tracks on a disk is limited to 99. The track information of each track is recorded in a zone called the program memory area (PMA) that is provided in the innermost circumference zone of the CD-R. Like the SDCB in DVD+R as mentioned above, the information recorded on PMA is usually read when the CD-R is loaded or mounted, is held in a memory, and is referred to as required.

According to a recording method called "packet-writing" for CD-R, it is possible that multiple pieces of data are recorded in a track one by one at different times. Accordingly, a partially recorded track can be present in CD-R. In the packet-writing recording method, data also have to be continuously recorded in a track from the starting address of the track. For this reason, it is necessary to determine the boundary position (for example, NWA) between a recorded zone and a non-recorded zone of the track, when adding data to the partially recorded track. Again, here in CD-R, the information about the boundary position between the recorded zone and the non-recorded zone is not provided in the disk, and NWA has to be detected each time data are to be added to the partially recorded track.

Conventionally, NWA of a track concerned (target track) of DVD+R and CD-R is detected by searching for the boundary position that divides the recorded zone and the non-recorded zone by sequentially scanning from the starting address toward the ending address of the target track, or by the so-called binary search by which a zone where NWA is expectedly to be contained is sequentially narrowed down. However, according to these detection methods, a problem is that detection time becomes long as the capacity of the target track is increased.

To cope with the problem, various apparatuses for shortening the detection time of NWA have been proposed (for example, patent reference 1 and patent reference 2).

[Patent reference 1]
JP,11-120573, A
[Patent reference 2]
JP,7-326158, A

Problem(s) to be Solved by the Present Invention

Generally, NWA is detected when at least one of a track information acquisition request and a data recording request is issued by a user. For this reason, when a reproduction request is issued, NWA may not have been detected yet. Under the situation that NWA has not been detected, if a reproduction request is issued to addresses where data are not recorded, the apparatus attempts to reproduce the non-recorded zone. Then, a reproduction error occurs, and the apparatus retries (re-attempts) reproduction for a predetermined number of times, resulting in degraded performance in responding to the reproduction request. To cope with this, it is conceivable that NWA detection be carried out prior to a reproduction request. When a PC controls an optical disk apparatus, the reproduction request from the user is provided to the optical disk apparatus by the operating system (OS) of the PC. If there is no information that the requested reproduction is completed from the optical disk apparatus after a predetermined time, a reset request is provided to the optical disk apparatus such that the reproduction process is compulsorily terminated. Since the apparatuses disclosed by the patent reference 1 and the patent reference 2 do not remarkably shorten the time for detecting NWA, a long detection time is required when the number of target tracks is great. The NWA detection time becoming long, there is a possibility of the reset request being provided while the reproduction request is being processed. For this reason, detecting NWA in advance of reproduction is not desirable.

SUMMARY OF THE INVENTION

Accordingly, it is a general object of the present invention to provide a reproduction method, a computer-executable program, a recording medium, and a drive apparatus that substantially obviate one or more of the problems caused by the limitations and disadvantages of the related art.

The first object of the present invention is to offer a reproduction method for providing a short response time to a reproduction request of an information recording medium.

The second object of the present invention is to offer a computer-executable program to be performed by a PC for controlling a drive apparatus capable of performing a reproduction process with a short response time to a request for reproducing contents of an information recording medium, and a recording medium that contains the computer-executable program.

The third object of the present invention is to offer a drive apparatus that can perform reproduction with a short response time.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by a reproduction method, a computer-executable program, a recording medium, and a drive apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides as follows.

The present invention provides a reproduction method for reproducing contents of an information recording medium having at least one data zone for storing data, wherein a non-recorded zone determination step is provided for determining whether there is a non-recorded zone in a reproduction zone, contents of which are requested to be reproduced.

In this manner, in the case that there is a non-recorded zone in the requested reproduction zone, an error process can be started quicker than in the conventional practices, shortening the response time to the reproduction request.

The non-recorded zone determination step can be performed at various predetermined timings, one of which timings is when the reproduction request is received.

In this case, an aspect of the present invention further provides an error processing step for outputting error information without attempting reproduction of the non-recorded zone if there is a non-recorded zone in the reproduction zone.

The predetermined timing can be a point in time when reproduction data are not obtained normally while reproducing the reproduction zone.

In this case, an aspect of the present invention further provides an error processing step for outputting error information without retrying reproduction of the non-recorded zone if there is a non-recorded zone in the reproduction zone.

An aspect of the present invention provides a boundary determination step for determining whether information about the boundary between a recorded zone and a non-recorded zone has been obtained, which boundary determination step is performed in advance of the non-recorded zone determination process that is performed only when the boundary determination step determines that the information about the boundary has not been obtained.

An aspect of the present invention provides a boundary setting step for setting the address of the boundary between the recorded zone and the non-recorded zone at the start address of the non-recorded zone of the reproduction zone when the start address of the non-recorded zone differs from the start address of the reproduction zone.

An aspect of the present invention provides a confirmed non-recorded zone updating step for updating the definition of a confirmed non-recorded zone when the start address of the non-recorded zone of the reproduction zone is less than the start address of the confirmed non-recorded zone, the confirmed non-recorded zone being a zone that is already confirmed as a non-recorded zone.

An aspect of the present invention further provides a confirmed non-recorded zone determination step for determining whether at least a part of the reproduction zone belongs to the confirmed non-recorded zone, and an error setting step for outputting error information without retrying reproduction of the part of the reproduction zone that belongs to the confirmed non-recorded zone.

An aspect of the present invention provides a confirmed recorded zone updating step for updating the definition of the confirmed recorded zone when the ending address of the zone where reproduction is normally performed is greater than the ending address of the confirmed recorded zone, the confirmed recorded zone being a zone that is already confirmed as a recorded zone.

An aspect of the present invention provides a confirmed recorded zone determination step for determining whether the entirety of the reproduction zone is included in the confirmed recorded zone. Only when the determination is negative, i.e., at least a part of the reproduction zone belongs to the confirmed non-recorded zone, the non-recorded zone determination step is performed.

An aspect of the present invention provides the confirmed non-recorded zone updating step, the confirmed recorded zone updating step, and a boundary defining step, wherein the boundary defining step is performed when the start address of the confirmed non-recorded zone is the same as the end address of the confirmed recorded zone such that the boundary between the recorded zone and the non-recorded zone is defined by the same address.

The present invention further provides a computer-executable program for carrying out the steps that are as summarized above.

The present invention further provides a computer-readable recording medium that contains the computer-executable program as described above.

Since the computer-executable program as described above is stored in the computer-readable recording medium, the response time to the requested reproduction is shortened by a computer executing the program.

The present invention further provides a drive apparatus for carrying out the steps of the reproduction method of the present invention, the drive apparatus including an optical pick up apparatus for irradiating a light beam to and receiving the light beam reflected from the recording surface of the information recording medium that has at least one data zone for storing data, and a processing apparatus for at least reproducing data stored in the information recording medium by using the output signal of the optical pick up apparatus. The processing apparatus, and therefore, the drive apparatus does not have to be, but may also be capable of recording and erasing data.

BRIEF DESCRIPTION OF THE DRAWINGS

FIG. 8A and FIG. 8B are second data diagrams for explaining the reproduction request process according to the present invention;

FIG. 9A and FIG. 9B are third data diagrams for explaining the reproduction request process according to the present invention;

FIG. 10A and FIG. 10B are fourth data diagrams for explaining the reproduction request process according to the present invention;

FIG. 11A and FIG. 11B are fifth data diagrams for explaining the reproduction request process according to the present invention;

FIG. 12A and FIG. 12B are sixth data diagrams for explaining the reproduction request process according to the present invention;

FIG. 13A and FIG. 13B are seventh data diagrams for explaining the reproduction request process according to the present invention;

FIG. 15 is a table for explaining the structure of a previous session item.

DESCRIPTION OF THE PREFERRED EMBODIMENTS

In the following, embodiments of the present invention are described with reference to the accompanying drawings.

Figure 1:
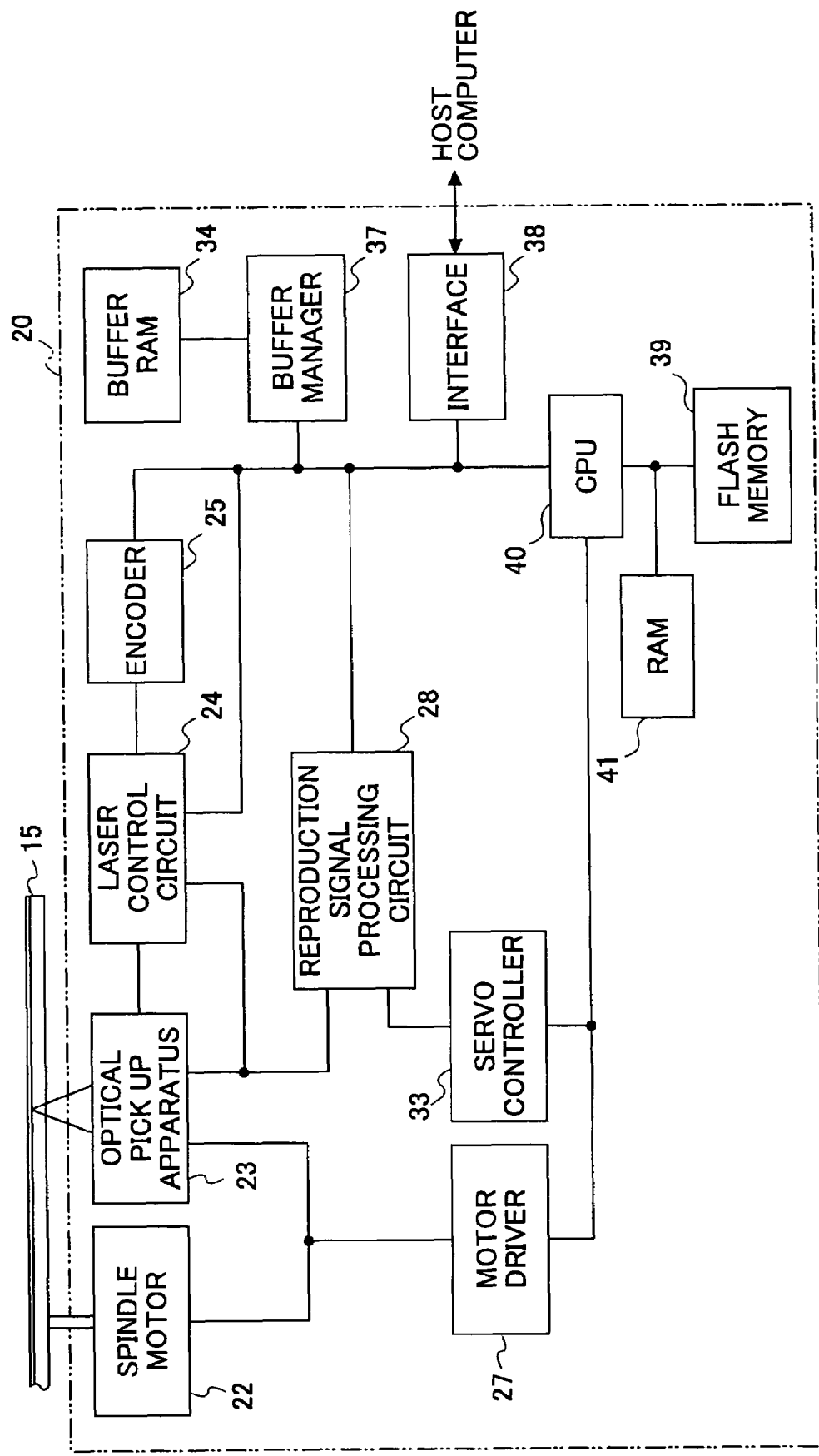
FIG. 1 is a block diagram showing the outline configuration of an optical disk apparatus according to an embodiment of the present invention.

FIG. 1 shows the outline configuration of an optical disk apparatus 20 according to the embodiment of the present invention.

The optical disk apparatus 20 includes a spindle motor 22 for rotating an optical disk 15 that serves as an information recording medium, an optical pickup apparatus 23, a laser control circuit 24, an encoder 25, a motor driver 27, a reproduction signal processing circuit 28, a servo controller 33, a buffer RAM 34, a buffer manager 37, an interface 38, a flash memory 39, a CPU 40, and a RAM 41. Note that FIG. 1 illustrates representative connection lines, showing a typical signal flow and a typical information flow, that is, not all connections are illustrated. In the present embodiment, the optical disk 15 is considered as an information recording medium based on the specification of DVD+R, for example. Further, the optical disk apparatus 20 is considered as being capable of recording data in and reproducing data from the optical disk 15.

The optical pickup apparatus 23 is for irradiating a laser beam (light beam) to the recording surface of the optical disk 15 that has at least one track as a data zone, to which data can be recorded; and for receiving the laser beam that is reflected by the recording surface. The optical pickup apparatus 23 includes items that are not illustrated such as a semiconductor laser serving as the luminous source for irradiating the laser beam having a wavelength of 660 nm, an objective lens for condensing the irradiated laser beam onto the recording surface, an optical system for guiding the laser beam reflected by the recording surface (return optical flux) to a predetermined light receiving position, an optical receiver arranged at the light-receiving position for receiving the return optical flux, and a driving system.

The optical receiver includes two or more optical receiver elements, and is for outputting a signal containing wobble signal information, reproduction data information, focal error information, track error information, etc. to the reproduction signal processing circuit 28.

The driving system includes a micro driving system for driving to produce a small amount of movement, and a coarse driving system for driving to produce a large amount of movement. The micro driving system includes a focusing actuator for minutely moving the objective lens in the direction of the optical axis (the direction of focusing), and a tracking actuator for minutely driving the objective lens in the direction of tracking. The coarse driving system includes a seeking motor (coarse motion motor) for driving the main part of the optical pickup in the radius direction of the optical disk 15, which main part includes the semiconductor laser, the optical system, the optical receiver, and the micro driving system.

Figure 2:
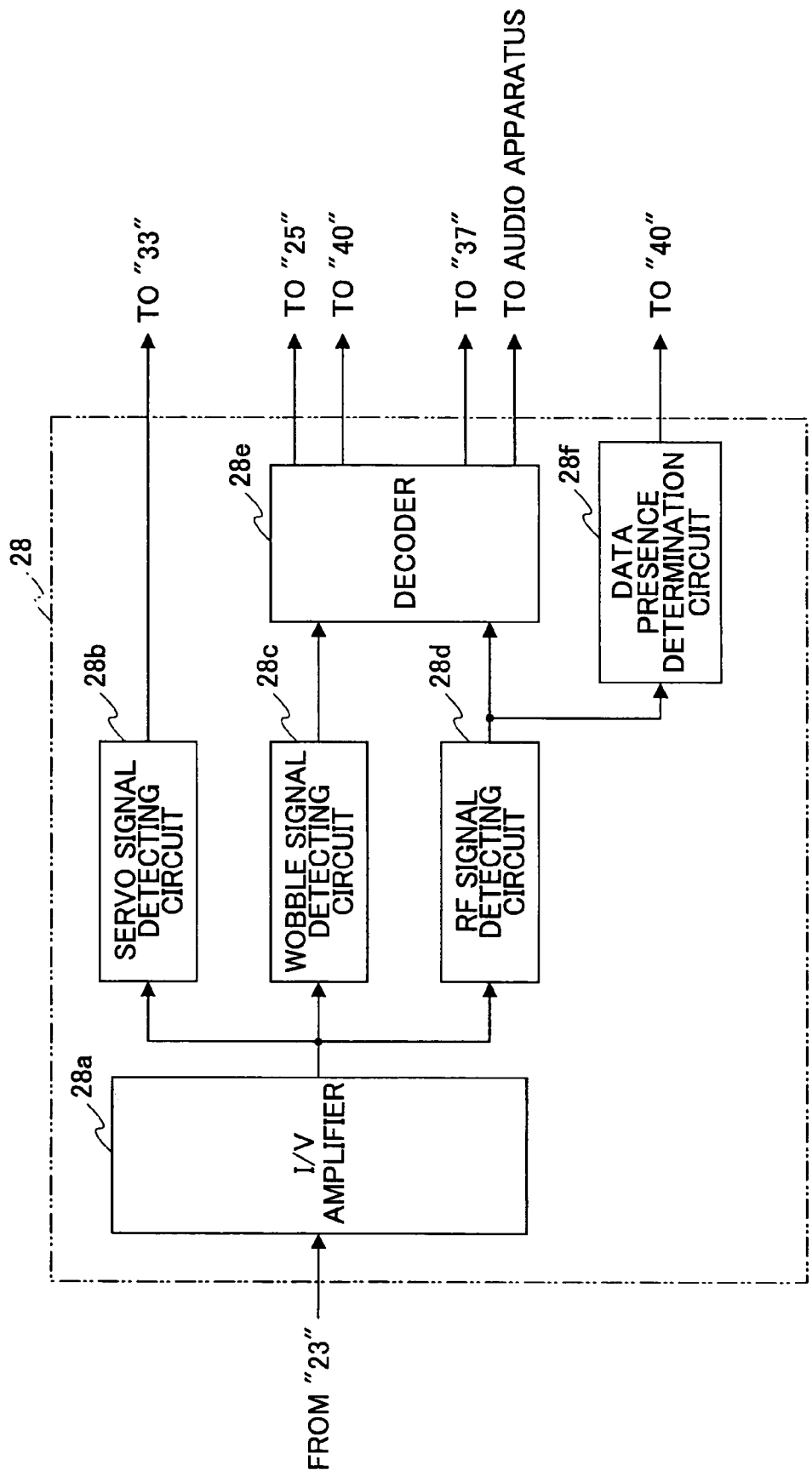
FIG. 2 is a block diagram showing the configuration of a reproducing signal processing circuit of FIG. 1.

As shown in FIG. 2, the reproduction signal processing circuit 28 includes an I/V amplifier 28a, a servo-signal detector 28b, a wobble signal detector 28c, an RF signal detector 28d, a decoder 28e, and a data presence determination circuit 28f serving as determining means for determining whether data are present in an zone.

The I/V amplifier 28a converts the signal output by the optical receiver of the optical pickup apparatus 23, which signal is a current signal, into a voltage signal, and amplifies the voltage signal at a predetermined gain. The servo-signal detector 28b detects servo signals (a focal error signal, a track error signal, etc.) based on the signal output from the I/V amplifier 28a. The servo signal detected here is output to the servo controller 33. The wobble signal detector 28c detects a wobble signal based on the output signal from the I/V amplifier 28a. The RF signal detector 28d detects an RF signal based on the output signal from the I/V amplifier 28a.

The decoder 28e extracts ADIP (Address In Pregroove) information, a synchronizing signal, etc., from the wobble signal detected by the wobble signal detector 28c. The ADIP information extracted here is output to the CPU 40, and a synchronizing signal is output to the encoder 25. Further, the decoder 28e receives the RF signal detected by the RF signal detector 28d, which RF signal is decoded by a decoding process, and an error detection process, etc., are carried out.

Then, the decoded and error-corrected signal, serving as reproduced data, is held in the buffer RAM 34 through the buffer manager 37. If the reproduced data are music data, the reproduced data are output to an external audio device, etc., from the decoder 28e after D/A conversion is carried out. If the error detection process detects an error, the decoder 28e performs a predetermined error correction process. Further, if the RF signal is abnormal and cannot be corrected by the error correction process, and reproduction data cannot be obtained normally, the decoder 28e determines that reproduction is impossible, and provides information indicating abnormal reproduction to the CPU 40. That is, the decoder 28e also serves as error monitoring means.

Based on the amplitude of the RF signal detected by the RF signal detector 28d, the data presence determination circuit 28f determines whether the RF signal is of a recorded zone or a non-recorded zone, and provides the result to the CPU 40. Here, when the amplitude of the RF signal is below a predetermined level, the RF signal is determined to be of a non-recorded zone.

With reference to FIG. 1, the servo controller 33 generates a focal control signal for compensating for a focal error based on a focal error signal provided by the reproduction signal processing circuit 28. Further, the servo controller 33 generates a tracking control signal for compensating for a tracking error based on a tracking error signal provided by the reproduction signal processing circuit 28. The control signals generated here are output to the motor driver 27.

The motor driver 27 outputs a focusing actuator drive signal to the optical pickup apparatus 23 based on the focal control signal, and outputs a tracking actuator drive signal to the optical pickup apparatus 23 based on the tracking control signal. That is, tracking control and focal control are performed by the servo-signal detector 28b, the servo controller 33, and the motor driver 27. Further, the motor driver 27 outputs a drive signal for the spindle motor 22 and the seeking motor based on a control signal from the CPU 40.

The buffer RAM 34 includes a buffer zone for temporarily holding data to be recorded in an optical disk, and data reproduced from an optical disk; a variable zone for holding various program variables; and the like.

The buffer manager 37 controls I/O (input and output) of the data to/from the buffer RAM 34, and provides information to the CPU 40 when the amount of data held in the buffer zone reaches a predetermined quantity.

The encoder 25 receives the data stored in the buffer zone of the buffer RAM 34 through the buffer manager 37 based on directions of the CPU 40, performs a predetermined data modulation process, an error correction code attaching process, etc., such that a signal to be written (write-in signal) in the optical disk 15 is generated, and the write-in signal is output to the laser control circuit 24 in synch with a synchronizing signal provided by the reproduction signal processing circuit 28.

The laser control circuit 24 controls the luminance (power) of the semiconductor laser according to directions of the CPU 40 and the write-in signal provided by the encoder 25.

The interface 38 is a bidirectional communication interface with a host (for example, a PC), and is based on the specification of, for example, ATAPI (AT Attachment Packet Interface).

The flash memory 39 stores a computer-readable program described in codes decipherable by the CPU 40, details of the computer-readable program according to the present invention being described below. The computer-readable program is executed according to a reproduction request from the host, and is called the reproduction program. The flash memory 39 is a non-volatile memory, and contents stored therein are maintained even if power is turned off.

The CPU 40 controls operations of the optical disk apparatus 20 according to the program stored in the flash memory 39, and saves data required for control, etc., in the RAM 41 and the buffer RAM 34.

Next, a layout of the information zone (IZ) in the case of a single session is explained with reference to FIG. 3, the information zone being of a DVD+R, and for storing various information items.

Figure 3:
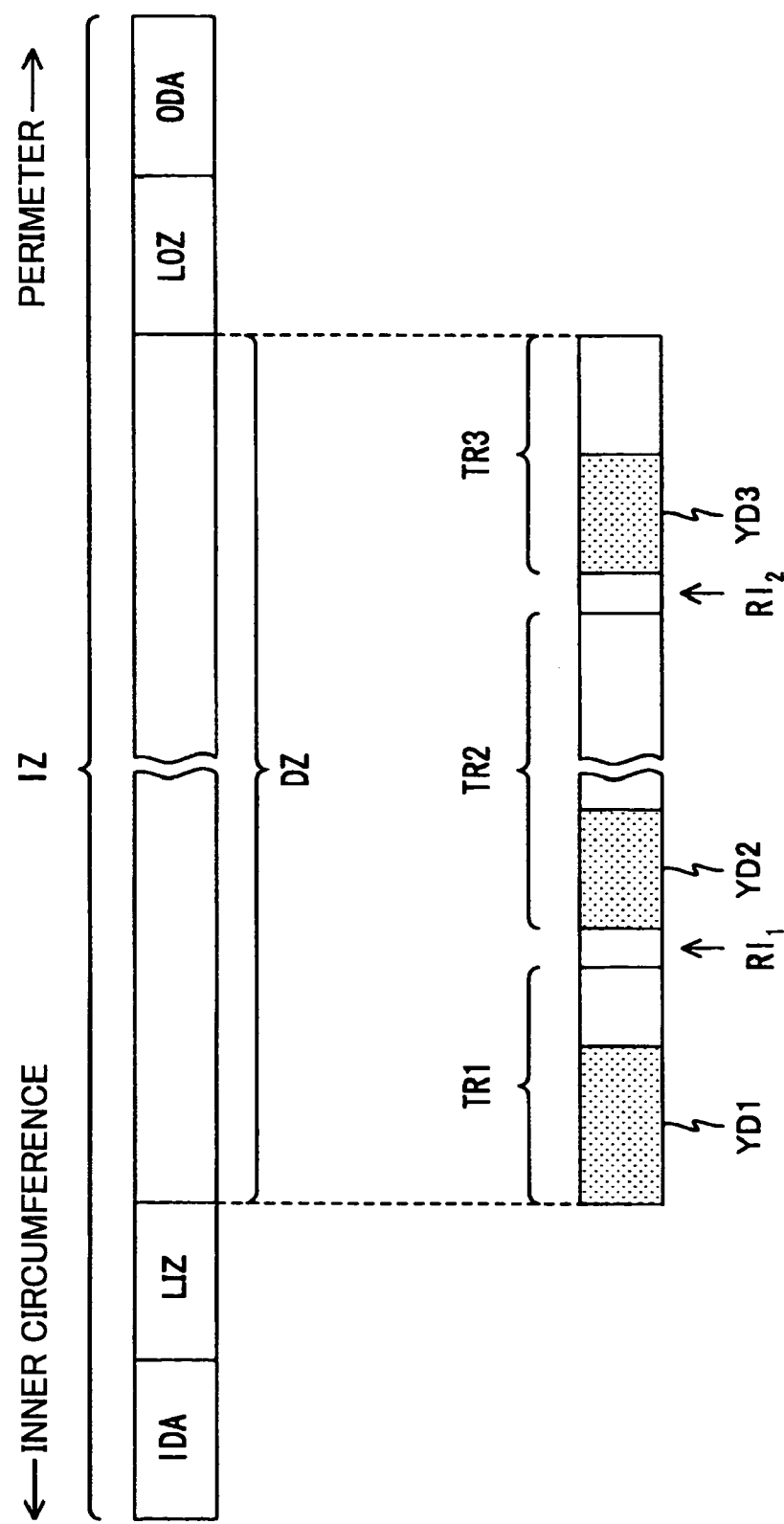
FIG. 3 is a data diagram for explaining a layout of the information zone (IZ) of DVD+R in the case of a single session.

As shown in FIG. 3, the information zone (IZ) includes an inner drive area (IDA), a lead-in zone (LIZ), a data zone (DZ), a lead-out zone (LOZ), and an outer drive area (ODA) in this sequence from the inner circumference to the perimeter of the disk. In the actual optical disk 15, the information zone (IZ) is structured in a spiral form; however, for sake of convenience, the information zone (IZ) is illustrated in linear form in FIG. 3.

In the data zone (DZ), up to 16 tracks can be present in a single session. In FIG. 3, an example wherein three tracks (TR1 through TR3) are present is shown. Further, it is assumed that recording has not been completed, the first track TR1 contains user data YD1, the second track TR2 contains user data YD2, and the third track TR3 contains user data YD3.

Between adjacent tracks, a zone called a run-in block (RI) is present. Here, as shown in FIG. 3, a run-in block RI1 is present between the first track TR1 and the second track TR2, and a run-in block RI2 is present between the second track TR2 and the third track TR3. The run-in block has a role of the so-called landing zone such that a head zone of the second track TR2 can be reproduced even if the last zone of the first track TR1 has no records. Each of the run-in blocks contains dummy data of 1 ECC block (=16 sectors), and does not belong to any of the tracks.

The lead-in zone (LIZ) includes a zone called a control data zone, which further includes a zone called "physical format information" where physical information of the optical disk is recorded. The physical format information consists of 2048 bytes ($B_0$ through $B_{2047}$). Bytes from the fifth byte ($B_4$) through the 16th ($B_{15}$) byte are called data zone allocation, wherein a start address, an ending address, etc., of the data zone DZ are recorded.

Figures 4, 5:
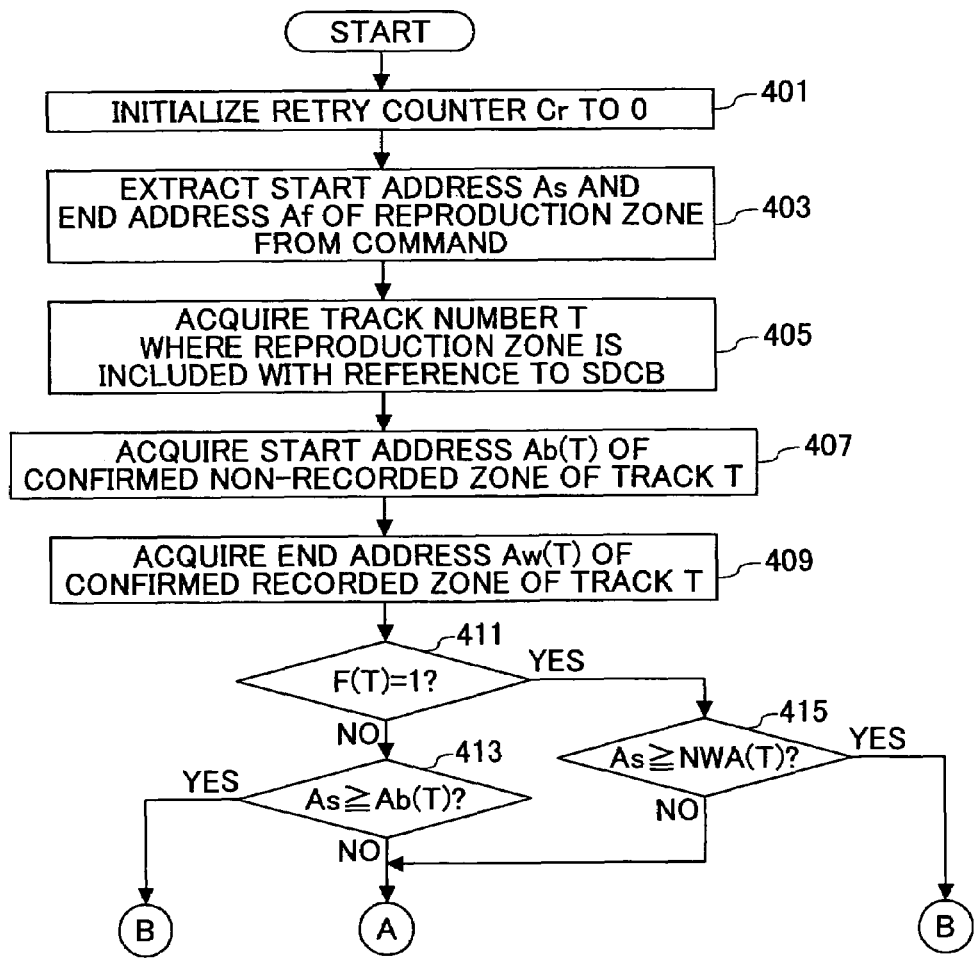
FIG. 4 is a table for explaining the structure of a fragment item.
FIG. 5 is a flowchart #1 for explaining a reproduction request process according to the present invention.

Further, LIZ includes a zone consisting of a 16 ECC blocks called an inner disk identification zone, wherein a session disk control block SDCB is present. The SDCB consists of 2048 bytes ($B_0$ through $B_{2047}$). After the 129th byte ($B_{128}$) of the SDCB, a zone called a session item is present, which zone consists of 16 bytes ($B_0$ through $B_{15}$), and contains a fragmentation item having a data structure as shown in FIG. 4. Specifically, the first 3 bytes ($B_0$ through $B_2$) contain "465247h" that is ASCII data representing "FRG", serving as a descriptor (fragment item descriptor) indicating that this is a fragmentation item. The track number (fragment number) is stored in $B_3$ through $B_4$, the starting address (fragment start address) of the track is recorded in $B_5$ through $B_7$, and the ending address (fragment end address) of the track is recorded in $B_8$ through $B_{10}$. The remaining 5 bytes ($B_{11}$ through $B_{15}$) are spare bytes (reserved), and are filled with "00h".

Here, the starting address and ending address of each of the first track TR1 and the second track TR2 are already defined. As for the third track TR3, although the starting address is already defined in reference to the ending address of the run-in block RI2, the ending address is not yet defined, because TR3 may be further divided into two or more tracks in the future. Therefore, although the fragmentation item of each of the first track TR1 and the second track TR2 is present in SDCB, the fragmentation item of the third track TR3 is not present in the SDCB. For this reason, the ending address of the third track TR3 is provisionally defined as the ending address of the data zone DZ. In this manner, the track information of all the tracks can be acquired by referring to the SDCB.

The lead-out zone LOZ includes a buffer zone 3 consisting of 768 sectors, an outer disk identification zone consisting of 256 sectors, and a guard zone 2 consisting of at least 4096 sectors. The buffer zone 3 is filled with "00h". The same contents as the inner disk identification zone of LIZ are recorded in the outer disk identification zone. The guard zone 2, which is filled with "00h", is a zone for clearly distinguishing the outer drive area ODA that is provided further outside of the guard zone 2 (i.e., toward the perimeter) such that recorded data are protected. When a disk is closed, lead-out is written. Once the disk is closed, no further data can be additionally recorded to the disk.

A trial writing zone for the so-called OPC (Optimum Power Control) that is carried out in advance of actual recording is included in the inner drive area IDA and the outer drive area ODA.

When the optical disk 15 is loaded (mounted) onto the optical disk apparatus 20 that is constituted as described above, by a process at the time of loading, the CPU 40 reads the information recorded in the SDCB of the LIZ, and loads the information in the RAM 41. That is, the track information is loaded in the RAM 41.

Further, the CPU 40 detects the number N of tracks contained in an open session of the optical disk 15. Further, an initial value 0 is set to each of NWA (next writable address) determination flags F(1) through F(N) that shows whether NWA of each track, namely, NWA(1) through NWA(N), is determined. Here, for example, F(N)=0 means that NWA of the Nth track is not determined, and F(N)=1 means that NWA of the Nth track is determined. Further, an ending address Aw(N) of a confirmed recorded zone, which is a zone that is confirmed as storing data, is defined for each track, namely, Aw(1) through Aw(N); and starting address Ab(N) of a confirmed non-recorded zone, which is a zone that is confirmed as storing no data, is defined for each track, namely, Ab(1) through Ab(N). As an initial value of Aw(1) through Aw(N) and Ab(1) through Ab(N), FFh is assigned. For example, Aw(N)=FFh means that the ending address of the confirmed recorded zone of the Nth track is not determined, and Ab(N)=FFh means that the start address of the confirmed non-recorded zone of the Nth track is not determined.

Figure 6:
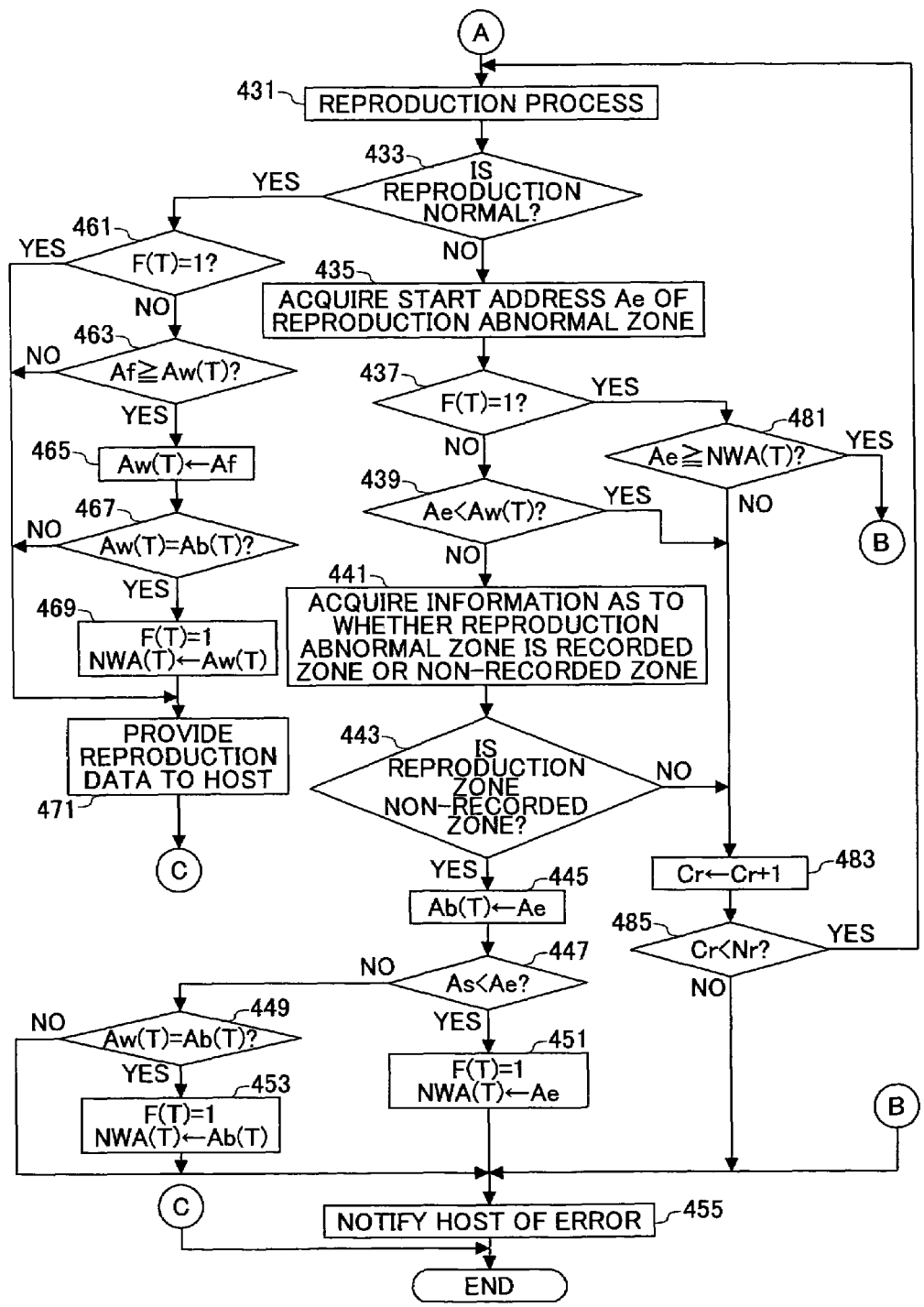
FIG. 6 is a flowchart #2 (continuation to the flowchart #1) for explaining the reproduction request process according to the present invention.

Next, a reproduction process of data recorded on the optical disk 15 using the optical disk apparatus 20 is explained with reference to FIG. 5 and FIG. 6. The flowcharts of FIG. 5 and FIG. 6 show a series of processing algorithms performed by the CPU 40. When a reproduction request (read command) is issued by the host, a read command monitoring step is performed, and the start address of a program for executing the process shown by the flowcharts of FIG. 5 and FIG. 6 is set to the program counter of the CPU 40, and the process, which is called a "reproduction request process", starts.

Here, as described above, the premise is that there is a session, data recording to which has not been completed, present in the data zone DZ of the optical disk 15, and the session includes three tracks (TR1 through TR3), data recording to which has not been completed (refer to FIG. 3). Further, it is premised that the reproduction request is the first reproduction request received after the loading of the optical disk 15; and, accordingly, NWA has not been acquired for any track.

At the first Step 401, a retry counter Cr for counting of the number of retry times of reproduction processing is initialized, that is, set to zero.

At the following Step 403, the start address As and the ending address Af of a reproduction target zone are extracted from the reproduction request.

At the following Step 405, a track number T of a track in which the reproduction target zone is contained is acquired with reference to the track information stored in the RAM 41. Then, the start address and ending address of the track having the track number T, i.e., the Tth track, are acquired. Here, for example, the reproduction target zone is assumed to belong to the third track TR3. Therefore, T=3.

At the following Step 407, the start address of a non-recorded zone of the Tth track Ab(T), i.e., Ab(3) in this example, is read from the RAM 41. Since a process for determining the non-recorded zone has not been carried out at this point in time, the value of Ab(T) is FFh. Here, the ending address of the Tth track is set to the start address Ab(T) of the non-recorded zone as a default value.

At the following Step 409, the ending address of the confirmed recorded zone of the Tth track Aw(T), i.e., Aw(3) in this example, is read from the RAM 41. Since a process for determining the recorded zone has not been carried out at this point in time, the value of Aw(T) is FFh. Here, the start address of the Tth track is set to the ending address Aw(T) of the confirmed recorded zone, a default value.

At the following Step 411, it is determined whether the NWA determination flag F(T), i.e., F(3) in this example, is 1. Here, since the initial value of F(T) is 0, the determination is negative, and the process proceeds to the following Step 413.

At Step 413, it is determined whether the value of the start address As of the reproduction zone is equal to or greater than the value of the start address Ab(T) of the confirmed non-recorded zone. Here, since As is less than Ab(T), the determination is negative, and the process proceeds to the following Step 431 shown in FIG. 6.

At Step 431, a process for reproducing the reproduction zone (reproduction process) is carried out. Details of the reproduction process are described below.

At the following Step 433, it is determined whether reproduction is normally performed. Specifically, for example, unless reproduction abnormal information is output from the decoder 28e of the reproduction signal processing circuit, it is determined that reproduction is normal. If reproduction is normal, the determination here is affirmative, and the process proceeds to Step 461, otherwise, i.e., if reproduction is abnormal, the determination is negative, and the process proceeds to Step 435.

At Step 435, a start address Ae of the reproduction abnormal zone is acquired, reproduction of which zone is determined to be abnormal at Step 433.

At the following Step 437, it is determined whether NWA determination flag F(T) is 1. Here, since F(T)=0, the determination is negative, and the process proceeds to Step 439.

At Step 439, it is determined whether the value of the address Ae is less than the value of the address Aw(T). Here, since Ae>=Aw(T), the determination is negative, and the process proceeds to Step 441.

At Step 441, information as to whether the reproduction abnormal zone is a recorded zone or a non-recorded zone is acquired from the data presence determination circuit 28f.

At the following Step 443, it is determined whether the reproduction abnormal zone is a non-recorded zone with reference to the contents of determination in Step 441. If the reproduction abnormal zone is determined to belong to a non-recorded zone, the determination is affirmative, and the process proceeds to Step 445. If, otherwise, the reproduction abnormal zone belongs to a recorded zone, the determination is negative, and the process proceeds to Step 483.

In the case that the determination at Step 443 is affirmative, the address Ae is substituted into the new address Ab(T) at Step 445, and stored in the RAM 41. That is, the address Ab(T) is updated. In this manner, the zone that is expected to contain NWA(T) is narrowed.

At the following Step 447, it is determined whether the value of the address Ae is greater than the value of the address As. If the value of the address Ae is greater than the value of the address As, the determination is affirmative, and the process proceeds to Step 451. If, otherwise, the address As is equal to the address Ae, the determination is negative, and the process proceeds to Step 449.

In the case that the determination at Step 447 is affirmative, 1 is set to the NWA determination flag F(T) at Step 451, indicating that NWA is determined; the address Ae is substituted into NWA(T); and the process proceeds to Step 455.

On the other hand, in the case that the determination at Step 447 is negative, the process proceeds to Step 449, where it is determined whether the ending address Aw(T) of the confirmed recorded zone is equal to the start address Ab(T) of the confirmed non-recorded zone. If the determination is affirmative, i.e., the address Aw(T) and the address Ab(T) are the same, the process proceeds to Step 453. If, otherwise, the address Aw(T) and the address Ab(T) are not equal, the determination is negative, and the process proceeds to Step 455.

At Step 453, since Aw(T)=Ab(T), 1 is set to the NWA determination flag F(T), which means that NWA is determined; the address Ab(T) (or the address Aw(T) that is the same) is substituted into NWA(T); and the process proceeds to Step 455.

At Step 455, the host is notified of error information with reasons, and the reproduction request processing is ended.

On the other hand, if the determination at the 443 is negative, the retry counter Cr is incremented by 1 at Step 483, and the process proceeds to Step 485.

At Step 485, it is determined whether the value of the retry counter Cr is less than a predetermined value Nr that is usually set at 2 or greater. Here, since this is the first retry, Cr=1, i.e., the determination is affirmative, and the process returns to Step 431, and the reproduction process is repeated. In addition, if the value of the retry counter Cr is determined to be equal to or greater than the predetermined value Nr, the determination at Step 485 is negative, and the process proceeds to Step 455. In this case, as for the cause of the abnormalities in reproduction, adhesion of a foreign substance, an abnormal vibration, poor recording quality, etc. are possible.

Further, if it is determined that Ae<Aw(T) at Step 439, the determination is affirmative, and the process proceeds to Step 483. That is, since it is clear that the reproduction abnormal zone is contained in the confirmed recorded zone, the determination as to whether the reproduction abnormal zone belongs to a recorded zone or a non-recorded is unnecessary.

Further, at Step 437, if the value of the NWA determination flag F(T) is 1, the determination at Step 437 is affirmative, and the process proceeds to Step 481.

At Step 481, it is determined whether the value of the address Ae is equal to or greater than the value of NWA(T). If it is determined that the value of the address Ae is less than NWA(T), the determination is negative, and the process proceeds to Step 483. That is, since it is clear that the reproduction abnormal zone is contained in the confirmed recorded zone, the determination as to whether the reproduction abnormal zone belongs to the recorded zone or the non-recorded zone is unnecessary. On the other hand, if the value of the address Ae is equal to or greater than the value of NWA(T), determination at Step 481 is affirmative, and the process proceeds to Step 455. That is, since it is clear the reproduction abnormal zone is contained in the confirmed non-recorded zone, error information is output without retrying the reproduction process, and the reproduction request process is ended.

On the other hand, if the reproduction process at Step 431 is normally performed, and determination at Step 433 is affirmative, the process proceeds to Step 461 where it is determined whether the value of the NWA determination flag F(T) is 1. Since F(T)=0, the determination is negative, and the process proceeds to Step 463.

At Step 463, it is determined whether the value of the address Af is equal to or greater than the value of the address Aw(T). Here, since Af>=Aw(T), determination is affirmative, and the process proceeds to Step 465.

At Step 465, the address Af is substituted into the new address Aw(T), which is stored in the RAM 41. That is, the address Aw(T) is updated. In this manner, the zone that is expected to contain NWA(T) is narrowed.

At the following Step 467, it is determined whether the ending address Aw(T) of the confirmed recorded zone is equal to the start address Ab(T) of the confirmed non-recorded zone. If the determination here is affirmative, the process proceeds to Step 469. If, otherwise, the determination is negative, the process proceeds to Step 471.

At Step 469, since Aw(T)=Ab(T), 1 is set to the NWA determination flag F(T), indicating that the NWA is determined. Then, the address Aw(T) (or address Ab(T)) is substituted into NWA(T), and the process proceeds to Step 471.

At Step 471, reproduction data are transmitted to the host, and the reproduction request process is ended.

In addition, if the value of the NWA determination flag F(T) is determined to be 1 at Step 461, since it is not necessary to update the address Aw(T), determination here at Step 461 is affirmative, and the process proceeds to Step 471. Further, at Step 463, if the value of the address Af is less than the value of the address Aw(T), it is clear that the reproduction zone is contained in the confirmed recorded zone, the determination is negative, and the process proceeds to Step 471. That is, the address Aw(T) is not updated.

Further, at Step 413, if the value of the address As is equal to or greater than the address Ab(T), the process proceeds to Step 455. That is, since the reproduction zone is contained in the confirmed non-recorded zone, error information is output without performing the reproduction process, and the reproduction request process is ended.

Further, at Step 411, if the value of the NWA determination flag F(T) is determined to be 1, the process proceeds to Step 415.

At Step 415, whether the value of the address As is equal to or greater than NWA (T). If the determination is negative, the process proceeds to Step 431. That is, since it is clear that the reproduction zone is contained in the confirmed recorded zone, the reproduction processing continues. On the other hand, if the determination is affirmative, the process proceeds to Step 455. That is, since it is clear the reproduction zone is contained in the confirmed non-recorded zone, error information is output without performing the reproduction process, and the reproduction request process is ended.

In the following, the reproduction process carried out at Step 431 is explained.

First, a control signal for controlling rotation of the spindle motor 22 is provided to the motor driver 27 based on a reproduction speed, and information that the reproduction request is received is provided to the reproduction signal processing circuit 28. When rotation of the optical disk 15 reaches a predetermined linear velocity, tracking control and the focal control are performed. The tracking control and the focal control are performed as required until the reproduction process is finished.

Next, a control signal is output to the motor driver 27, the control signal being for controlling the seeking motor so that optical pickup apparatus 23 is moved to a read-out start point based on ADIP information that is output from the decoder 28e at every predetermined interval.

When the optical pickup apparatus 23 reaches the read-out start point, a signal indicating the fact is provided to the reproduction signal processing circuit 28. Then, data reproduced by the RF signal detector 28d and the decoder 28e are stored in the buffer RAM 34.

Here, the reproduction process is explained with reference to attached drawings, FIGS. 7A, 7B, and through 13A, and 13B, wherein reproduction commands are sequentially received from the host after loading the optical disk 15. It is further assumed that recording quality of the optical disk 15 is of an acceptable level.

<<Reproduction Command 1>>

Figure 7A:
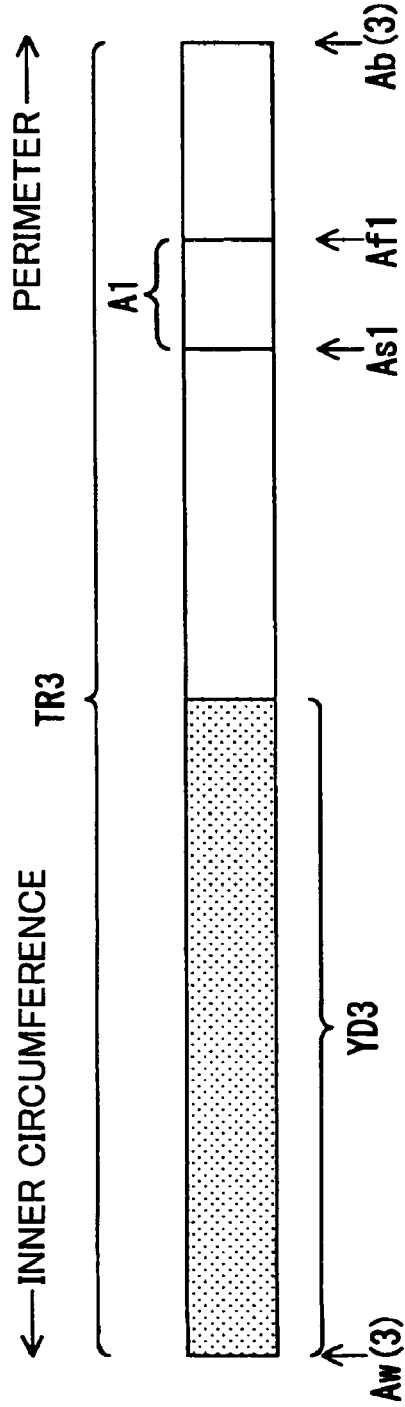
FIG. 7A and FIG. 7B are first data diagrams for explaining the reproduction request process according to the present invention.
Figure 7B:
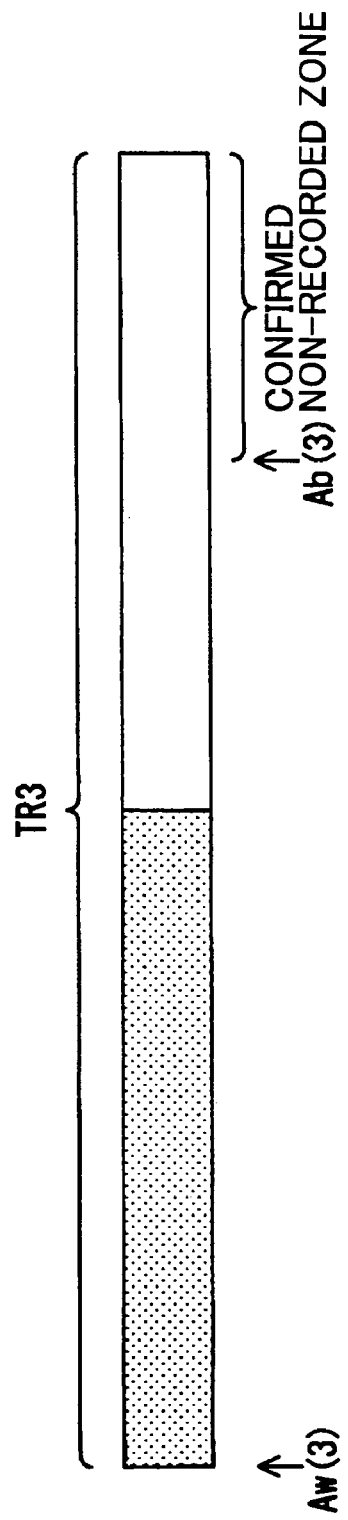

For example, with reference to FIG. 7A, suppose that a first reproduction command is issued, which directs to reproduce a zone A1, the start address of which is As1, and the ending address of which is Af1, of the third track TR3. If the zone A1 is a non-recorded zone, the reproduction process is attempted once, an address error occurs, the address error is provided to the host, and the first reproduction process is ended. When this reproduction process is completed, the zone delimited by As1 and Ab(3) in FIG. 7A is "confirmed" as being a non-recorded zone, and Ab(3) is moved to the left (younger address) to As1 as shown in FIG. 7B, i.e., the zone starting from the updated Ab(3) is called the confirmed non-recorded zone. Note that the whole of the non-recorded zone may be greater than the confirmed non-recorded zone that is just updated. At this juncture, no zone has been confirmed as a confirmed recorded zone.

<<Reproduction Command 2>>

Suppose that, subsequently, a second reproduction command is issued, which directs to reproduce a zone A2, the start address of which is As2, and the ending address of which is Af2, as shown in FIG. 8A, the zone A2 not being included in the confirmed non-recorded zone of the third track TR3. It is still unknown whether the zone A2 is in the recorded zone or in the non-recorded zone. Then, if the zone A2 is determined to belong to the recorded zone, the reproduction process is carried out, reproduced data are provided to the host, and the reproduction process is ended. When this reproduction process is completed, the zone delimited by Af2 and Aw(3) in FIG. 8A is "confirmed" as being a recorded zone, and Aw(3) is moved to the right (greater address) as shown in FIG. 8B, i.e., the zone ending with the updated Aw(3) is called the confirmed recorded zone. Note that the whole of the recorded zone may be greater than the confirmed recorded zone. At this juncture, the confirmed non-recorded zone remains the same as before.

<<Reproduction Command 3>>

Suppose that, subsequently, a third reproduction command is issued, which directs to reproduce a zone A3, the start address of which is As3, and the ending address of which is Af3, the zone A3 being included in the confirmed recorded zone of the third track TR3 as shown in FIG. 9A. Then, the reproduction process is carried out, and reproduced data are provided to the host, and the reproduction process is ended. Here, as shown in FIG. 9B, the confirmed recorded zone and the confirmed non-recorded zone remain the same as before.

<<Reproduction Command 4>>

Suppose that, subsequently, as shown in FIG. 10A, a fourth reproduction command is issued, which directs to reproduce a zone A4, the start address of which is As4 and the ending address of which is Af4, the zone A4 not being included in either the confirmed recorded zone or the confirmed non-recorded zone of the third track TR3. If the zone A4 is a recorded zone, the reproduction process is carried out, reproduced data are provided to the host, and the reproduction process is ended. When this reproduction process is completed, a wider area is recognized as the confirmed recorded zone, namely, the zone ending at the updated Aw(3), into which Af4 is substituted, is the updated confirmed recorded zone as shown in FIG. 10B. Here, the confirmed non-recorded zone remains the same as before.

<<Reproduction Command 5>>

Suppose that, subsequently, as shown in FIG. 11A, a fifth reproduction command is issued, which directs to reproduce a zone A5, the start address of which is As5, and the ending address of which is Af5, the zone A5 not being included in either of the confirmed recorded zone and the confirmed non-recorded zone of the third track TR3. If the zone A5 is determined to be a non-recorded zone, the reproduction process is performed once, an address error occurs, the address error is provided to the host, and the reproduction process is ended. When this reproduction process is completed, as shown in FIG. 11B, the confirmed non-recorded zone is updated as starting at the updated Ab(3), into which As5 is substituted. Here, the confirmed recorded zone remains the same as before.

If, at this juncture, a track information acquisition request is issued by the host, the track information containing NWA about the zone between the address Aw(3) and the address Ab(3) is provided, and NWA is obtained based on the RF signal. In this case, since it is not necessary to trace the entire third track TR3, NWA can be acquired in a shorter time than conventional practices. Accordingly, the response time to the track information acquisition request is shortened.

<<Reproduction Command 6>>

Suppose that, subsequently, a sixth reproduction command is issued, which directs to reproduce a zone A6, the start address of which is As6, and the ending address of which is Af6, the zone A6 being included in the confirmed non-recorded zone of the third track TR3 as shown in FIG. 12A. Since the zone A6 is known to belong to the confirmed non-recorded zone, the reproduction process is not performed, an address error is provided to the host, and the reproduction process is ended. That is, the host can immediately be notified of the address error. Here, as shown in FIG. 12B, the confirmed recorded zone and the confirmed non-recorded zones remain the same as before.

<<Reproduction Command 7>>

Suppose that, subsequently, as shown in FIG. 13A, a seventh reproduction command is issued, which directs to reproduce a zone A7, the start address of which is As7, and the ending address of which is Af7, the zone A7 not being included in either the confirmed recorded zone or the confirmed non-recorded zone of the third track TR3. Here, the zone A7 consists of a recorded zone in the front, and a non-recorded zone in the rear. The front part is reproduced, and reproduced data are provided to the host. As for the rear part, an address error occurs, the address error is provided to the host, and the reproduction process is ended. When this reproduction process is completed, as shown in FIG. 13B, the ending address of the confirmed recorded zone becomes the same as the starting address of the of the confirmed non-recorded zone, namely, the address Aw(3) becomes equal to the address Ab(3), which is made into the NWA(3). In this manner, the NWA of the track 3 TR3, namely NWA(3), is determined.

Accordingly, if a track information acquisition request is issued from the host at this juncture, the track information containing the NWA as determined above is provided. That is, since the NWA of the third track TR3 is already obtained, there is no need for determining NWA again. In this manner, the track information acquisition request can be answered in a shorter time than the conventional practices. In other words, the responsiveness to the track information acquisition request is raised.

Next, a recording process that is carried out when a recording command is received from the host is explained briefly. Usually, the host issues a track information acquisition request before the recording command, and NWA is acquired. Accordingly, the NWA is set to the recording command as the recording-start address.

The CPU 40 outputs a control signal to the motor driver 27 for controlling the rotation of the spindle motor 22 based on recording speed, and a signal indicating the fact that the recording command is received from the host is provided to the reproduction signal processing circuit 28. In this manner, when the rotation of the optical disk 15 reaches a predetermined linear velocity, tracking control and focal control are performed. The tracking control and the focal control are performed as desired until the recording process is completed. Further, the CPU 40 directs the buffer manager 37 such that data received from the host be stored in the buffer RAM 34.

The CPU 40 outputs a control signal to the motor driver 27 for controlling the seeking motor of the optical pickup apparatus 23 so that the optical pickup apparatus 23 is moved to a writing start position based on the ADIP information output from the decoder 28e at every predetermined interval.

When the buffer manager 37 determines that the amount of data stored in the buffer RAM 34 exceeds a predetermined volume, the CPU 40 directs the encoder 25 to generate a writing signal. When the optical pickup apparatus 23 arrives at the writing start position, the CPU 40 provides the fact to the encoder 25. In this manner, the data are written in the zone that follows YD3 (refer to FIG. 3) through the encoder 25, the laser control circuit 24, and the optical pickup apparatus 23. The recording process is ended if all the data received from the host are written.

As described above, the optical disk apparatus according to the embodiment of the present invention realizes error processing means, error setting means, NWA determination means, boundary setting means, confirmed non-recorded zone updating means, non-recorded zone determination means, confirmed recorded zone updating means, recorded zone determination means, boundary defining means, and the processing apparatus by the CPU 40 executing the computer-executable program. That is, the process at Step 411 of FIG. 5 realizes the determination means, and the process at Step 413 realizes the non-recorded determination means. Further, the process at Step 431 of FIG. 6 realizes the processing apparatus, the process at Step 439 realizes the recorded zone determination means, and the process at Step 455 realizes the error processing means and the error setting means. Furthermore, the processes at Steps 447 and 451 realize the boundary setting means, the process at Step 445 realizes the confirmed non-recorded zone determination means, and the processes at Steps 463 and 465 realize the confirmed recorded zone determination means. Further, the processes at Steps 449 and 453, and the processes at Steps 467 and 469 realize the boundary determination means. However, of course, the present invention is not limited to this. That is, the embodiment as described above is just an example. A part, parts or all of the means and the processing apparatus realized as above by the CPU and the program can be realized by hardware.

Further, according to the embodiment of the present invention, the reproduction program is constituted by the program corresponding to the flowcharts shown in FIG. 5 and FIG. 6 among programs installed in the flash memory 39.

The process at Step 441 realizes the determination process of the reproduction method according to the present invention. Further, the process at Step 411 realizes the determination process, the process at Step 413 realizes the non-recorded zone determination process, the process at Step 439 realizes the recorded zone determination process, and the process at Step 455 realizes the error process and the error setting process. Furthermore, the processes at Steps 447 and 451 realize the boundary setting process, the process at Step 445 realizes the confirmed non-recorded zone updating process, and the processes at Steps 463 and 465 realize the confirmed recorded zone updating process. Further, the processes at Steps 449 and 453, and the processes at Steps 467 and 469 realize the boundary determination process.

As described above, according to the optical disk apparatus of the present invention, when reproduction data are not obtained normally from the reproduction target zone in a track (DZ) of the optical disk, it is determined whether data are recorded in the entirety of the reproduction target zone, or the reproduction target zone includes a non-recorded zone. Then, for example, even if a reproduction request is made for a reproduction target zone that includes a non-recorded zone, error information can be provided to the host in a shorter time than the conventional practices, since it is already determined that the non-recorded zone is present in the reproduction target zone before retrying the reproduction process. That is, useless retry attempts of the reproduction process are avoided. As the result, the reproduction process provides a quick response to the reproduction request.

Further, according to the embodiment of the present invention, if the reproduction target zone is determined to include a non-recorded zone with reference to NWA, in the case that NWA is already determined, error information is output without attempting to reproduce the non-recorded zone. Therefore, the response to the reproduction request command is further improved.

Further, according to the embodiment of the present invention, in the case that there is an abnormality in reproduction, and the start address of the reproduction abnormal zone differs from the start address of the reproduction target zone, the start address of the reproduction abnormal zone is made to be the NWA of the track. In this manner, NWA can be detected without performing the time-consuming NWA detection process.

Further, according to the embodiment of the present invention, when the start address of the non-recorded zone of the reproduction target zone is less than the start address of the confirmed non-recorded zone, the start address of the confirmed non-recorded zone is updated. In this manner, the zone in which the NWA is expected to be present is narrowed down.

Further, according to the embodiment of the present invention, when the ending address of the recorded zone of the reproduction target zone is greater than the ending address of the confirmed recorded zone, the ending address of the confirmed recorded zone is updated. In this manner, the zone in which the NWA is expected to be present is narrowed down.

Further, according to the embodiment of the present invention, if at least a part of the reproduction target zone is in the confirmed non-recorded zone, error information is output without performing the reproduction process of the zone that belongs to the confirmed non-recorded zone. In this manner, the response to the reproduction request command is further improved.

Further, according to the embodiment of the present invention, when the entire reproduction target zone belongs to the confirmed recorded zone, the reproduction process is retried in the case that reproduction is abnormal. In this manner, if the reproduction is abnormal for an isolated reason, the reproduction process may succeed through the retries.

Further, according to the embodiment of the present-invention, when the start address of the confirmed non-recorded zone is equal to the ending address of the confirmed recorded zone, such address is made to be the NWA of the track without performing the time-consuming NWA detection process.

Here, the embodiment described above is the case wherein a determination is carried out as to whether a reproduction abnormal zone is in the recorded zone, or in the non-recorded zone when reproduction is abnormal. The present invention is not limited to this, but the determination can be carried out as to whether the first part of the reproduction target zone belongs to the recorded zone, or the non-recorded zone, when a reproduction command is received from the host; and, if the first part is determined to belong to the non-recorded zone, error information is provided to the host without processing the reproduction. In this manner, useless reproduction attempts can be avoided.

Further, although the embodiment described above refers to the case where the number of tracks is three, the present invention is not limited to this, but the number of tracks can be one through 16.

Further, although the embodiment described above refers to the case where the reproduction target zone belongs to the third track, the present invention does not limit where the reproduction target zone should belong to, i.e., the reproduction target zone may belong to any track.

Figure 14:
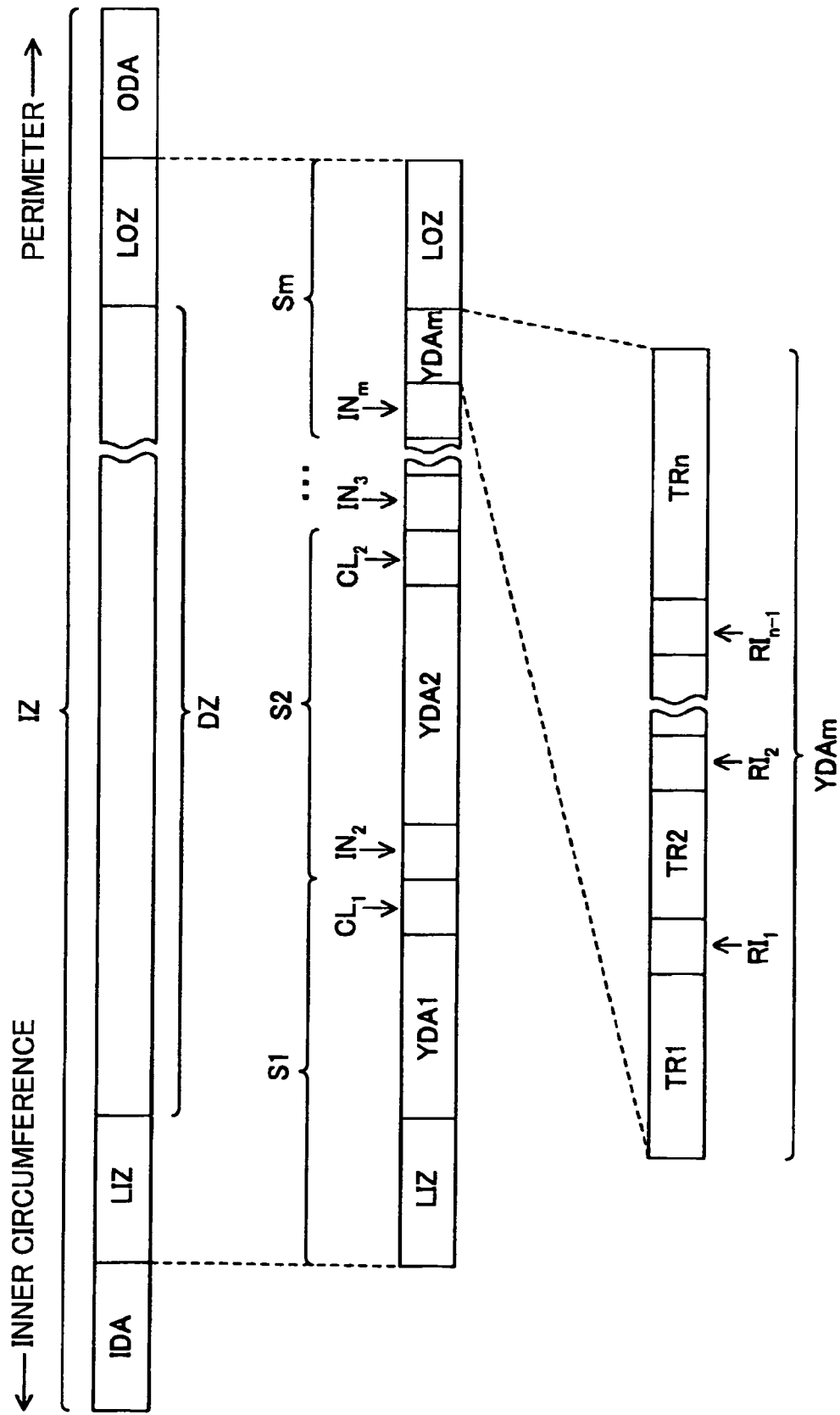
FIG. 14 is a data diagram for explaining the layout of the information zone of a DVD+R in the case of multiple sessions.

Further, although the embodiment described above refers to the case where only one session is present on the disk, the present invention is not limited to this, but two or more sessions may be present on the disk. In the case of DVD+R as shown in FIG. 14, for example, the number m of sessions that can be present is 1 through 191. A first session S1 includes a lead-in zone LIZ, a user data zone YDA1, and a closure zone $CL_1$. A second session S2 includes an introductory (intro) zone IN2, a user data zone YDA2, and a closure zone $CL_2$. The last session Sm includes an intro zone INm, a user data zone YDAm, and a lead-out zone LOZ.

In each user data zone YDAn, up to 16 tracks may be present. FIG. 14 shows the case where there are n tracks (TR1 through TRn: where n<=16) present in the user data zone YDAm of the last session Sm. Further, between adjacent tracks, a run-in block zone $IN_n$ is present like the case of a single-session.

Each intro zone, consisting of 1024 sectors, includes a zone called an inner session identification zone wherein session configuration information and the like are recorded, wherein the zone of the SDCB is present. In the intro zone, two types of information are recorded in the session item.

The first of the types, Type 1, is the fragmentation item (refer to FIG. 4).

The second of the types, Type 2, is called a previous session item, and information about all the sessions before a current session is recorded in 16 bytes as shown in FIG. 15. The first 3 bytes ($B_0$ through $B_2$) represent a descriptor that identifies that this is the previous session item (Previous Session item descriptor). Specifically, the 3 bytes contain ASCII data "505253h" expressing "PRS". The subsequent byte $B_3$ is a reserved byte, the byte $B_4$ stores a session number (Previous Session number), the bytes $B_5$ through $B_7$ store the starting address (Previous Session start address) of the session, and the bytes $B_8$ through $B_{10}$ store the ending address (Previous Session end address) of the session. The remaining 5 bytes $B_{11}$, through $B_{15}$ are reserved bytes. The reserved bytes are provisionally filled with "00h". The number of the session items is equal to the number of sessions that are present before the current session. In addition, the sector-format type (attribute) of each sector of the intro zone is not "lead-in" but "data", and an address is assigned so that the host can access.

Each closure zone consists of a buffer zone C consisting of 768 sectors, and an outer session identification zone consisting of 256 sectors. The buffer zone C is a reserved zone and is provisionally filled with "00h". The same contents as the inner session identification zone of the intro zone of the same session are recorded to the outer session identification zone. In addition, writing to a closure zone is carried out when a session is closed. Once the session is closed, no further writing is possible to the session.

If the last session Sm is an open session, it is possible to record data to a part of each of the tracks (TR1 through TRn) of the user data zone YDAm. In addition, if a reproduction request is received from the host in that case, a reproduction process can be performed as described above.

Further, although the embodiment described above refers to the case where both the start address of the confirmed non-recorded zone and the ending address of the confirmed recorded zone are obtained, an implementation wherein only one of them is obtained is possible. Even if only one is obtained, the zone wherein NWA is expected to be present can be made narrower than conventional practices.

Further, although the embodiment described above refers to the case where the interface is based on the specification of ATAPI, the interface may be based on the specification of one of ATA (AT Attachment), SCSI (Small Computer System Interface), USB (Universal Serial Bus) 1.0, USB 2.0, IEEE 1394, IEEE 802.3, serial ATA, and serial ATAPI.

Further, although the embodiment described above refers to the case where the optical disk apparatus is capable of handling DVD+R, the present invention is, not limited to this, but the optical disk apparatus can be one that is capable of handling CD-R.

Further, although the embodiment described above refers to the case where the reproduction program is recorded in the flash memory 39, the reproduction program may be recorded in other record media, such as a CD system optical disk, a DVD system optical disk, a magneto-optical disk, a memory card, and a flexible disk. In this case, a drive apparatus corresponding to a chosen recording medium is additionally provided, and the reproduction program is provided to the flash memory 39 from the chosen drive apparatus. Further, the reproduction program may be provided to the flash memory 39 through networks (LAN, intranet, Internet, etc.).

Further, although the embodiment described above refers to an optical disk apparatus that is capable of recording and reproduction, the present invention also applies to an optical disk apparatus that is capable of only reproduction.

Further, although the embodiment described above refers to the case where an optical disk apparatus is used as the drive apparatus, the present invention is not limited to this.

EFFECT OF THE INVENTION

As explained above, according to the reproduction method of the present invention, the responsiveness to a request for reproducing contents of an information recording medium is effectively improved.

Further, according to the program and recording medium of the present invention, a computer for controlling the drive apparatus executes the program such that the reproduction process is performed with improved responsiveness to the request for reproducing the contents of the information recording medium.

Further, according to the drive apparatus of the present invention, the reproduction process is performed with improved responsiveness.

Further, the present invention is not limited to these embodiments, but various variations and modifications may be made without departing from the scope of the present invention.

The present application is based on Japanese Priority Application No. 2003-119781 filed on Apr. 24, 2003, with the Japanese Patent Office, the entire contents of which are hereby incorporated by reference.

What is claimed is:

1. An information reproduction method for reproducing contents of an information recording medium that has at least one data zone for storing data, comprising:
    a boundary determination step for determining whether information about a boundary between the recorded zone and the non-recorded zone has been obtained; and
    a non-recorded zone determination step, performed when the boundary determination step determines that the information about the boundary has not been obtained, for determining whether the entirety of a reproduction zone is a recorded zone wherein data are stored, or whether at least a part of the reproduction zone is a non-recorded zone wherein no data are stored at a predetermined timing when or after a request for reproduction (reproduction request) is received, the reproduction zone having contents which are requested to be reproduced by the reproduction request, and being included in the data zone of the information recording medium.

2. The information reproduction method as claimed in claim 1, wherein the predetermined timing is set at a point in time when the reproduction request is received.

3. The reproduction method as claimed in claim 2, further comprising:
    an error processing step for outputting error information without reproducing the non-recorded zone when the non-recorded zone is determined to be present in the reproduction zone at the non-recorded zone determination step.

4. The reproduction method as claimed in claim 1, wherein the predetermined timing is set at a point in time when reproduction data are not obtained normally while reproducing the reproduction zone.

5. The reproduction method as claimed in claim 4, further comprising:
    an error processing step for outputting error information without retrying reproduction of the non-recorded zone when the non-recorded zone is determined to be present in the reproduction zone at the non-recorded zone determination step.

6. The reproduction method as claimed in claim 1, further comprising:
    a boundary setting step;
    wherein a start address of the non-recorded zone of the reproduction zone is made into the address of the boundary between the recorded zone and the non-recorded zone when the non-recorded zone is determined to be present in the reproduction zone at the non-recorded zone determination step, and when the start address of the non-recorded zone differs from the start address of the reproduction zone.

7. The reproduction method as claimed in claim 1, further comprising:
    a confirmed non-recorded zone updating step wherein a start address of a zone that has been confirmed as a non-recorded zone (confirmed non-recorded zone) is updated if a start address of a non-recorded zone of the reproduction zone is less than the start address of the confirmed non-recorded zone.

8. The reproduction method as claimed in claim 7, further comprising:
    a confirmed non-recorded zone determination step for determining whether at least a part of the reproduction zone is included in the confirmed non-recorded zone, which step is performed in advance of the non-recorded zone determination step; and
    an error setting step for outputting error information without reproducing the zone included in the confirmed non-recorded zone when at least a part of the reproduction zone is determined to be included in the confirmed non-recorded zone at the confirmed non-recorded zone determination step.

9. The reproduction method as claimed in claim 1, further comprising:
    a confirmed recorded zone updating step;
    wherein an end address of a zone that has been confirmed as a recorded zone (confirmed recorded zone) is updated if an end address of the reproduction zone, reproduction of which has been normally performed, is greater than the ending address of the confirmed recorded zone.

10. The reproduction method as claimed in claim 9, further comprising:
    a confirmed recorded zone determination step for determining whether the entirety of the reproduction zone is contained in the confirmed recorded zone, the confirmed recorded zone determination step being performed in advance of the non-recorded zone determination step, and the non-recorded zone determination step is performed only when at least a part of the reproduction zone is determined not to be contained in the confirmed recorded zone at the confirmed recorded zone determination step.

11. The reproduction method as claimed in claim 1, further comprising:
    a confirmed non-recorded zone updating step wherein a start address of a zone that has been confirmed as a non-recorded zone (confirmed non-recorded zone) is updated if the non-recorded zone determination step determines that a non-recorded zone is present in the reproduction zone, and if a start address of the non-recorded zone is less than the start address of the confirmed non-recorded zone;
    a confirmed recorded zone updating step wherein an end address of a zone that has been confirmed as a recorded zone (confirmed recorded zone) is updated if an end address of the reproduction zone, reproduction of which has been normally performed, is greater than the ending address of the confirmed recorded zone; and a boundary defining step that is performed if the start address of the confirmed non-recorded zone is the same as the end address of the confirmed recorded zone, wherein the address of the boundary of the recorded zone and the non-recorded zone is defined by the same address.

12. A computer-readable recording medium that stores a program for causing a control computer of a drive apparatus, that is capable of at least reproducing data stored in an information recording medium that has at least one data zone for storing data, to execute:

a read command monitoring step for monitoring a request for reproduction of a zone (reproduction zone) of the data zone of the information recording medium;

a boundary determination step for determining whether information about a boundary between the recorded zone and the non-recorded zone has been obtained; and a non-recorded zone determination step, performed when the boundary determination step determines that the information about the boundary has not been obtained, for determining whether the entirety of the reproduction zone is a recorded-zone wherein data are stored, or at least a part of the reproduction zone is a non-recorded zone wherein no data are stored at a predetermined timing when or after the request for reproduction (reproduction request) is received.

13. The computer-readable recording medium as claimed in claim 12, wherein the predetermined timing is set at a point in time when the reproduction request is received.

14. The computer-readable recording medium as claimed in claim 13, wherein the program further causes the control computer to execute:

a step for outputting error information without reproducing the non-recorded zone when the non-recorded zone is determined to be present in the reproduction zone at the non-recorded zone determination step.

15. The computer-readable recording medium as claimed in claim 12, wherein the timing is a point in time when reproduction data are not obtained normally while reproducing the reproduction zone.

16. The computer-readable recording medium as claimed in claim 15, wherein the program further causes the control computer to execute:

a step for outputting error information without retrying reproduction of the non-recorded zone when the non-recorded zone is determined to be present in the reproduction zone at the non-recorded zone determination step.

17. The computer-readable recording medium as claimed in claim 12, wherein the program further causes the control computer to execute:

a boundary setting step for making the start address of the non-recorded zone of the reproduction zone into the address of the boundary between the recorded zone and the non-recorded zone if the non-recorded zone is determined to be present in the reproduction zone at the non-recorded zone determination step, and if the start address of the non-recorded zone differs from the start address of the reproduction zone.

18. The computer-readable recording medium as claimed in claim 12, wherein the program further causes the control computer to execute:

a confirmed non-recorded zone updating step for updating the start address of a zone that has been confirmed as a non-recorded zone (confirmed non-recorded zone) if the start address of the non-recorded zone of the reproduction zone is less than the start address of the confirmed non-recorded zone.

19. The computer-readable recording medium as claimed in claim 18, wherein the program further causes the control computer to execute:

a confirmed non-recorded zone determination step for determining whether at least a part of the reproduction zone is included in the confirmed non-recorded zone, which step being performed in advance of the non-recorded zone determination step; and a step for outputting error information without reproducing the zone included in the confirmed non-recorded zone when at least a part of the reproduction zone is determined to be included in the confirmed non-recorded zone at the confirmed non-recorded zone determination step.

20. The computer-readable recording medium as claimed in claim 12, wherein the program further causes the control computer to execute:

a step for updating an end address of a zone that has been confirmed as a recorded zone (confirmed recorded zone) if an end address of the reproduction zone, reproduction of which has been normally performed, is greater than the ending address of the confirmed recorded zone.

21. The computer-readable recording medium as claimed in claim 20, wherein the program further causes the control computer to execute:

a confirmed recorded zone determination step for determining whether the entirety of the reproduction zone is contained in the confirmed recorded zone, the confirmed recorded zone determination step being performed in advance of the non-recorded zone determination step, and the non-recorded zone determination step is performed only when at least a part of the reproduction zone is determined not to be contained in the confirmed recorded zone at the confirmed recorded zone determination step.

22. The computer-readable recording medium as claimed in claim 12, wherein the program further causes the control computer to execute:

a confirmed non-recorded zone updating step wherein a start address of a zone that has been confirmed as a non-recorded zone (confirmed non-recorded zone) is updated if a start address of a non-recorded zone of the reproduction zone is less than the start address of the confirmed non-recorded zone;

a confirmed recorded zone updating step wherein an end address of a zone that has been confirmed as a recorded zone (confirmed recorded zone) is updated if an end address of the reproduction zone, reproduction of which has been normally performed, is greater than the ending address of the confirmed recorded zone; and a boundary defining step that is performed if the start address of the confirmed non-recorded zone is the same as the end address of the confirmed recorded zone, wherein the address of the boundary of the recorded zone and the non-recorded zone is defined by the same address.

23. A drive apparatus capable of at least reproducing data by irradiating a light beam to an information recording medium that has at least one data zone for storing data, comprising:

a boundary determination means for determining whether the information about the boundary between the recorded zone where the date in are recorded;

a non-recorded zone determination means, when the boundary determination means determines that the information about the boundary has not been obtained, for determining whether data are recorded in the entirety of a reproduction zone, contents of which are requested for reproduction (reproduction request), or the reproduction zone contains a non-recorded zone where data are not recorded, the reproduction zone being included in the data zone of the information recording medium, and the non-recorded zone determination being carried out at a predetermined timing on or after a point in time when the reproduction request is received;

an optical pickup apparatus for receiving the light irradiated to and reflected from the information recording medium; and a processing apparatus for at least reproducing data using an output signal of the optical pickup apparatus, which processing apparatus does not have to be, but may also be capable of writing and erasing data.

24. The drive apparatus as claimed in claim 23, wherein the predetermined timing is set at a point in time when the reproduction request is received.

25. The drive apparatus as claimed in claim 24, further comprising:
an error setting means for outputting error information without reproducing the non-recorded zone when the non-recorded zone is determined to be present in the reproduction zone by the non-recorded zone determination means.

26. The drive apparatus as claimed in claim 23, further comprising:
an error monitoring means for monitoring a reproduction error occurring during reproduction performed by the processing apparatus, and the predetermined timing is set at a point in time when a reproduction error is detected by the error monitoring means.

27. The drive apparatus as claimed in claim 26, further comprising:
an error processing means for outputting error information without retrying reproduction of the non-recorded zone when the non-recorded zone is determined to be present in the reproduction zone by the non-recorded zone determination means.

28. The drive apparatus as claimed in claim 23, further comprising:
a boundary setting means for making the start address of the non-recorded zone of the reproduction zone into the boundary address between the recorded zone where the data are recorded, and the non-recorded zone where data are not recorded, when the non-recorded zone determination means determines that the non-recorded zone is present in the reproduction zone, and when the start address of the non-recorded zone differs from the start address of the reproduction zone in the reproduction zone.

29. 1he drive apparatus as claimed in claim 23, further comprising:
a confirmed non-recorded zone memory unit for storing information about a data zone that has been confirmed as a non-recorded zone (confirmed non-recorded zone); and
a confirmed non-recorded zone updating means for updating the information about the confirmed non-recorded zone stored in the confirmed non-recorded zone memory if the non-recorded zone determination means determines that the non-recorded zone is present in the reproduction zone, and if the start address of the non-recorded zone of the reproduction zone is less than the start address of the confirmed non-recorded zone stored in the confirmed non-recorded zone memory.

30. The drive apparatus as claimed in claim 29, further comprising:
a confirmed non-recorded zone determination means for determining whether at least a part of the reproduction zone belongs to the confirmed non-recorded zone based on the information about the confirmed non-recorded zone stored in the confirmed non-recorded zone memory; and
an error setting means for outputting error information without reproducing the zone that is determined to belong to the confirmed non-recorded zone by the confirmed non-recorded zone determination means.

31. The drive apparatus as claimed in claim 29, wherein two or more data zones are formed on the recording surface of the information recording medium, and the information about the confirmed non-recorded zone for each data zone is stored in the confirmed non-recorded zone memory.

32. The drive apparatus as claimed in claim 23, further comprising
a confirmed recorded zone memory for storing information about a zone that has been confirmed as a recorded zone; and
a confirmed recorded zone updating means for updating the information about the confirmed recorded zone stored in the confirmed recorded zone memory if the ending address of a zone, reproduction of which is normally performed, of the reproduction zone is greater than the ending address of the confirmed recorded zone stored in the confirmed recorded zone memory.

33. The drive apparatus as claimed in claim 32, further comprising:
a confirmed recorded zone determination means for determining whether the entirety of the reproduction zones is included in the confirmed recorded zone based on the information about the confirmed recorded zone stored in confirmed recorded zone memory, wherein the non-recorded zone determination step is performed by the non-recorded zone determination means only when the confirmed recorded zone determination means determines that at least a part of the reproduction zone is not included in the confirmed recorded zone.

34. The drive apparatus as claimed in claim 32, wherein two or more data zones are formed on the recording surface of the information recording medium, and the information about the confirmed recorded zone for each data zone is stored in the confirmed recorded zone memory.

35. The drive apparatus as claimed in claim 23, further comprising:
a confirmed zone memory for storing address information of the data zone, comprising the start address of the confirmed non-recorded zone where it is already confirmed that data are not recorded, and the ending address of the confirmed recorded zone where it is already confirmed that data are recorded;
a confirmed non-recorded zone updating means for updating the start address of the confirmed non-recorded zone stored in the confirmed zone confirmed zone memory if the non-recorded zone determination means determines that the non-recorded zone is present in the reproduction zone, and if the start address of the non-recorded zone of the reproduction zone is less than the start address of the confirmed non-recorded zone stored in the confirmed zone memory;

a confirmed recorded zone updating means for updating the ending address of the confirmed recorded zone stored in the confirmed zone memory when the ending address of the zone, reproduction of which is normally performed, is greater than the ending address of the confirmed recorded zone stored in the confirmed zone memory; and a boundary defining means for defining the boundary address of the recorded zone where the data in the data zone are recorded, and the non-recorded zone where data are not recorded, if the start address of the confirmed non-recorded zone and the ending address of the confirmed recorded zone are the same, by the same address.

36. The drive apparatus as claimed in claim 35, wherein two or more data zones are formed on the recording surface of the information recording medium, and the address information of each data zone is stored in the confirmed zone memory.

37. The drive apparatus as claimed in claim 23, wherein the information recording medium is capable of storing additional information, but does not allow rewriting of data.

38. The drive apparatus as claimed in claim 37, wherein the information recording medium is an information recording medium based on the specification of DVD+R.

\* \* \* \* \*